(12) United States Patent
Yun et al.

(10) Patent No.: US 7,209,453 B1
(45) Date of Patent: Apr. 24, 2007

(54) SYSTEM AND METHOD FOR TOLERATING CONTROL LINK FAULTS IN A PACKET COMMUNICATIONS SWITCH FABRIC

(75) Inventors: Kenneth Yi Yun, San Diego, CA (US); Michael John Hellmer, Carlsbad, CA (US); David Thomas Dougherty, Allentown, PA (US); Philip Michael Clovis, San Diego, CA (US); Eli James Aubrey Fernald, San Diego, CA (US); Peter John Holzer, Fallbrook, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 865 days.

(21) Appl. No.: 10/378,521

(22) Filed: Mar. 3, 2003

Related U.S. Application Data

(63) Continuation-in-part of application No. 10/023,266, filed on Dec. 14, 2001, now abandoned, and a continuation-in-part of application No. 10/022,673, filed on Dec. 17, 2001, now Pat. No. 7,079,545, and a continuation-in-part of application No. 10/029,581, filed on Dec. 20, 2001, and a continuation-in-part of application No. 10/035,835, filed on Dec. 24, 2001, now Pat. No. 7,020,131.

(51) Int. Cl.
*H04J 1/16* (2006.01)
*H04J 3/14* (2006.01)

(52) U.S. Cl. .................. 370/242; 370/244; 370/250

(58) Field of Classification Search ............... 370/216, 370/241, 242, 244, 250, 217, 218
See application file for complete search history.

(56) References Cited

U.S. PATENT DOCUMENTS

| | | | | |
|---|---|---|---|---|
| 6,654,381 | B2 * | 11/2003 | Dally et al. | 370/412 |
| 2002/0150056 | A1 * | 10/2002 | Abadi et al. | 370/256 |
| 2004/0160970 | A1 * | 8/2004 | Dally et al. | 370/412 |
| 2006/0013207 | A1 * | 1/2006 | McMillen et al. | 370/388 |

* cited by examiner

*Primary Examiner*—Ajit Patel
(74) *Attorney, Agent, or Firm*—Law Office of Gerald Maliszewski; Gerald Maliszewski

(57) ABSTRACT

A system and method are provided for tolerating control link faults in a packet communications switch fabric. The method comprises: accepting information packets including a plurality of cells, at a plurality of port card ports, the plurality of information packets addressing a plurality of port card ports; selectively connecting port card ports to port card backplane data links; in response to backplane control link communications, selectively connecting port card backplane data links and crossbars; sensing a connection fault in a control link; and, in response to sensing the control link fault, reselecting connections between the port card ports and the port card backplane data links. In some aspects, selectively connecting port card backplane data links and crossbars includes: for a particular backplane data link, fixedly connecting each port card to a corresponding interface of an assigned crossbar; and, selectively enabling the connection to each crossbar.

29 Claims, 21 Drawing Sheets

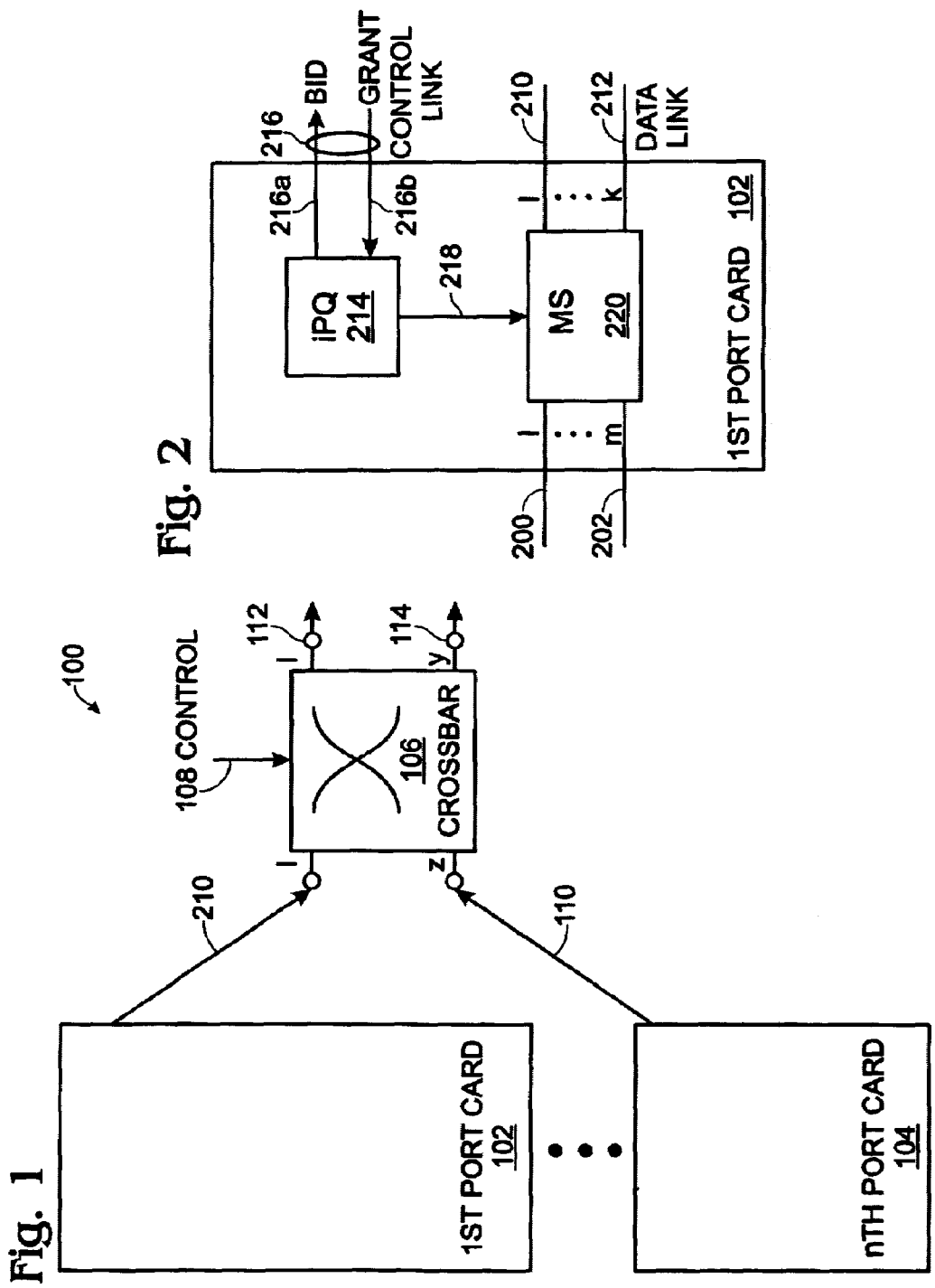

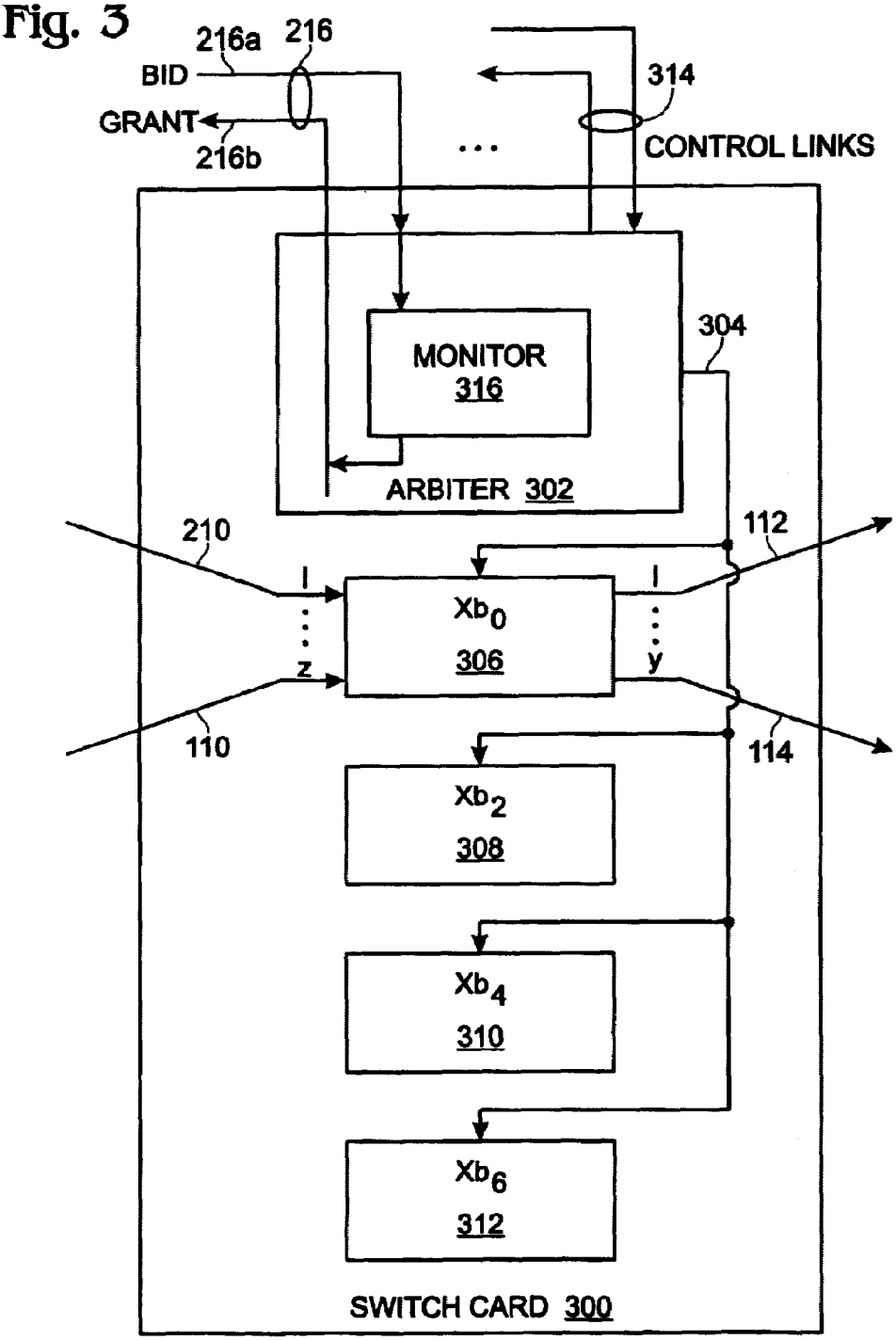

Fig. 14

| | S8905 MS (INGRESS) | | | | S8905 MS (EGRESS) | | |
|---|---|---|---|---|---|---|---|
| | IN | OUT | | | IN | OUT | |
| INGRESS CHANNEL 0 | 0<br>1<br>2<br>3<br>4<br>5<br>6<br>7<br>8<br>9 | 0<br>1<br>2<br>3<br>4<br>5<br>6<br>7<br>8<br>9 | BACKPLANE CHANNEL 0 | BACKPLANE CHANNEL 0 | 0<br>1<br>2<br>3<br>4<br>5<br>6<br>7<br>8<br>9 | 0<br>1<br>2<br>3<br>4<br>5<br>6<br>7<br>8<br>9 | EGRESS CHANNEL 0 |
| INGRESS CHANNEL 1 | 10<br>11<br>12<br>13<br>14<br>15<br>16<br>17<br>18<br>19 | 10<br>11<br>12<br>13<br>14<br>15<br>16<br>17<br>18<br>19 | BACKPLANE CHANNEL 1 | BACKPLANE CHANNEL 1 | 10<br>11<br>12<br>13<br>14<br>15<br>16<br>17<br>18<br>19 | 10<br>11<br>12<br>13<br>14<br>15<br>16<br>17<br>18<br>19 | EGRESS CHANNEL 1 |
| INGRESS CHANNEL 2 | 20<br>21<br>22<br>23<br>24<br>25<br>26<br>27<br>28<br>29 | 20<br>21<br>22<br>23<br>24<br>25<br>26<br>27<br>28<br>29 | BACKPLANE CHANNEL 2 | BACKPLANE CHANNEL 2 | 20<br>21<br>22<br>23<br>24<br>25<br>26<br>27<br>28<br>29 | 20<br>21<br>22<br>23<br>24<br>25<br>26<br>27<br>28<br>29 | EGRESS CHANNEL 2 |
| INGRESS CHANNEL 3 | 30<br>31<br>32<br>33<br>34<br>35<br>36<br>37<br>38<br>39 | 30<br>31<br>32<br>33<br>34<br>35<br>36<br>37<br>38<br>39 | BACKPLANE CHANNEL 3 | BACKPLANE CHANNEL 3 | 30<br>31<br>32<br>33<br>34<br>35<br>36<br>37<br>38<br>39 | 30<br>31<br>32<br>33<br>34<br>35<br>36<br>37<br>38<br>39 | EGRESS CHANNEL 3 |

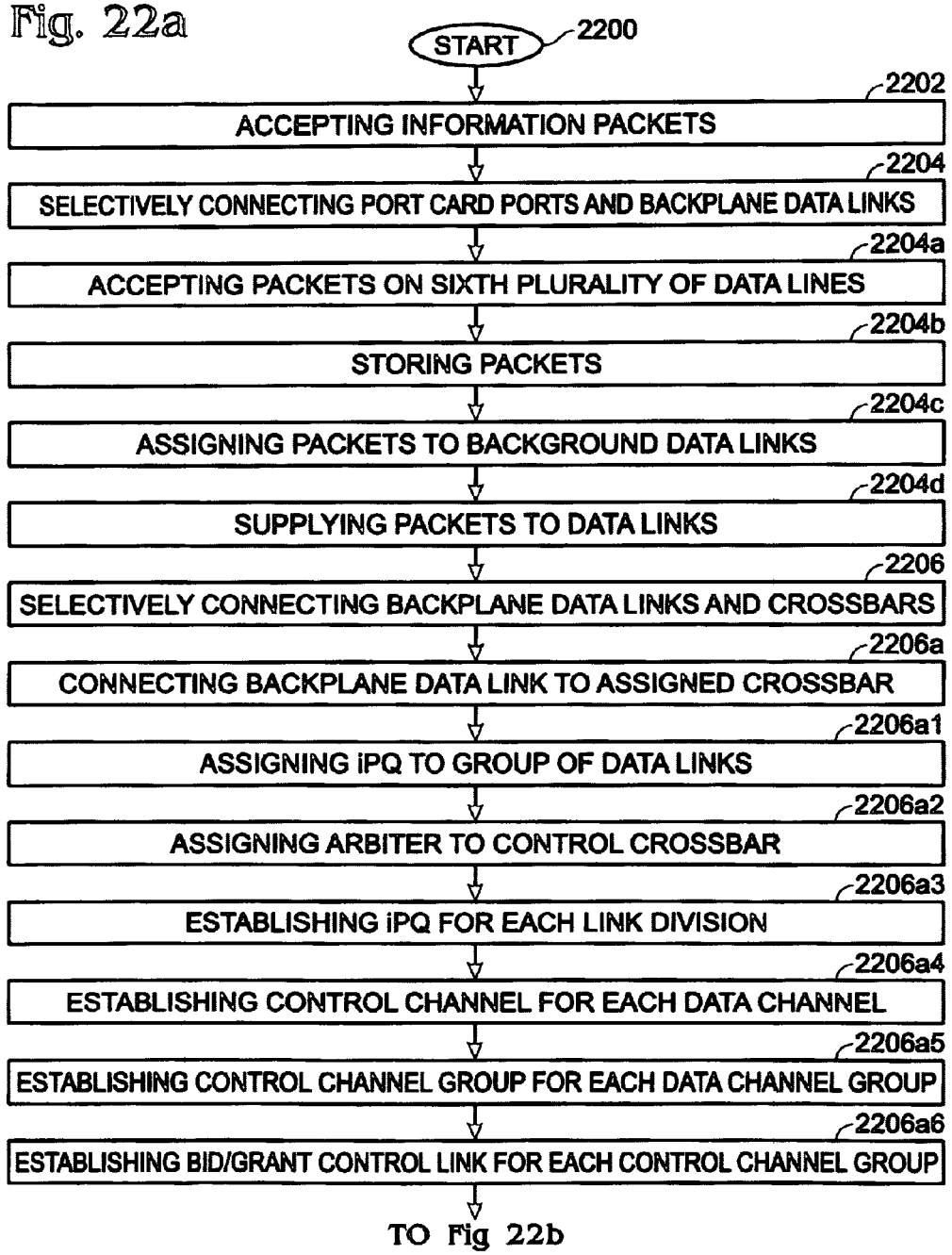

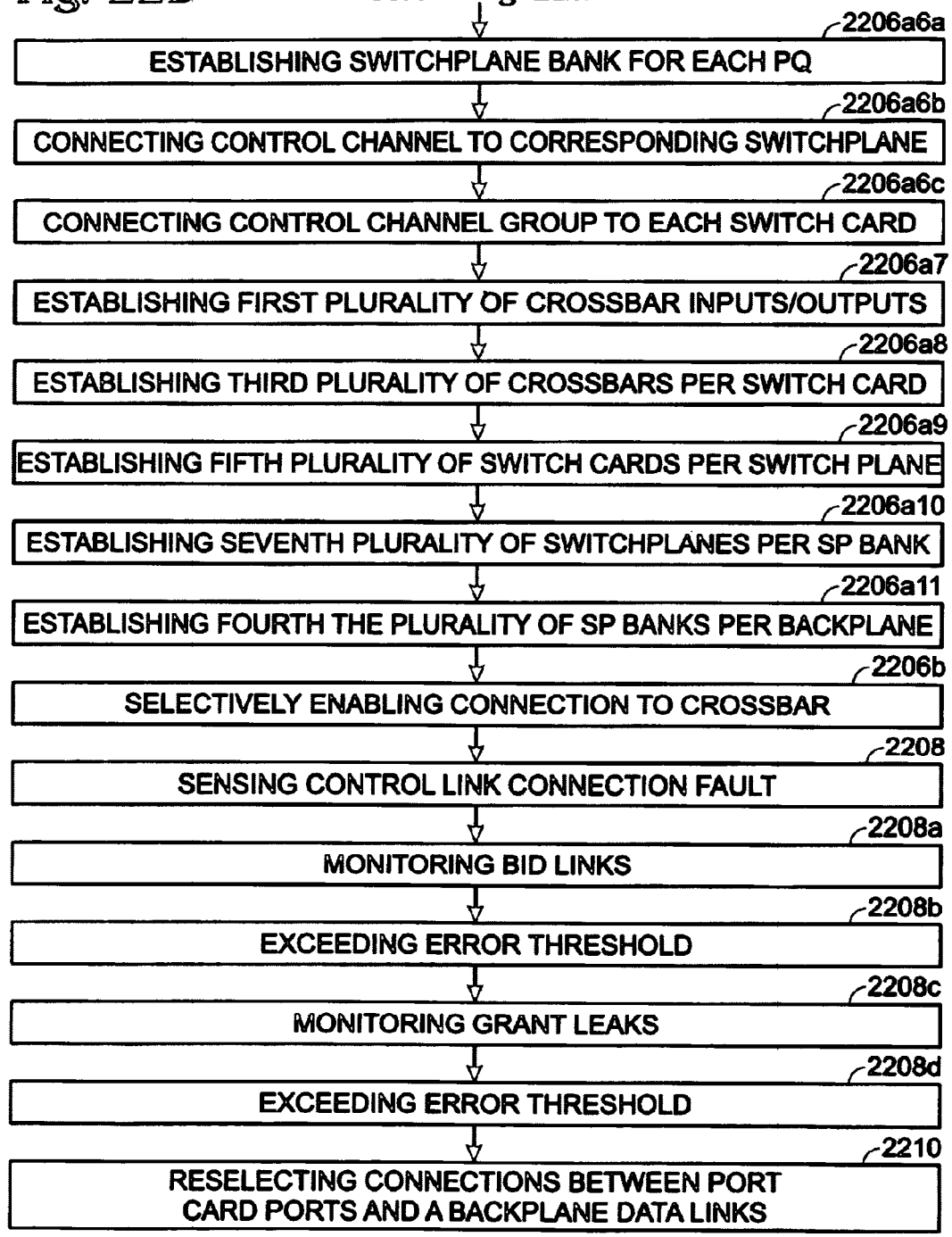

SYSTEM AND METHOD FOR TOLERATING CONTROL LINK FAULTS IN A PACKET COMMUNICATIONS SWITCH FABRIC

RELATED APPLICATIONS

This application is a continuation-in-part of a application entitled, SYSTEM AND METHOD FOR SWITCHING VARIABLY SIZED INFORMATION GROUPS, invented by Yun et al., Ser. No. 10/023,266, filed Dec. 14, 2001 now abandoned.

This application is a continuation-in-part of a application entitled, SYSTEM AND METHOD FOR SIMULTANEOUS DEFICIT ROUND ROBIN PRIORITIZATION, invented by Yun et al., Ser. No. 10/022,673, filed Dec. 17, 2001 now U.S. Pat. No. 7,079,545.

This application is a continuation-in-part of a pending application entitled, SYSTEM AND METHOD FOR GRANTING ARBITRATED BIDS IN THE SWITCHING OF INFORMATION, invented by Yun et al., Ser. No. 10/029,581, filed Dec. 20, 2001.

This application is a continuation-in-part of a application entitled, SYSTEM AND METHOD FOR HIERARCHICAL SWITCHING, invented by Yun et al., Ser. No. 10/035,835, filed Dec. 24, 2001 now U.S. Pat. No. 7,020,131.

BACKGROUND OF THE INVENTION

1. Field of the Invention

This invention generally relates to packet communications switching and, more particularly, to a system and method of tolerating control link faults in a packet communications switch fabric.

2. Description of the Related Art

There is industry demand for integrated circuits (ICs) switching systems that can be easily scaled for Network Access, the Network Edge, or a Core Switch Router, at the high end. SCSA (Signal Computing System Architecture) defines a switch fabric to be the facility for connecting any two (or more) transmitting or receiving Service Providers.

FIG. 7 is a schematic block diagram of a general switch fabric system (prior art). Traffic enters the system on the ingress side (the left side of the figure). Traffic exits the system on the egress side (the right side of the figure). The port card ingress and egress structures are sometimes subdivided into channels and subchannels. The packet headers specify a required destination port card, channel, and subchannel. The system must synchronously route each ingress packet to the correct egress destination.

Packets are converted into frames by ingress traffic managers (iTMs). A frame is a logical unit of data, which is often a small piece of a much larger data set such as a file or image. The iTMs feed the ingress side of the fabric. The switch fabric might convert the frame format to a "native" format, and then on egress, convert the data back into the TM frame format before sending the data to the egress traffic managers (eTMs). If the frames are fixed size (for example: 53 bytes, 64 bytes, or 80 bytes), the frames are often called cells.

Protocol Specific vs. Protocol Agnostic

A switch fabric can be protocol specific or protocol agnostic. An example of a protocol specific switch fabric would be a system designed and optimized specifically for asynchronous transfer mode (ATM) traffic. Another example would be a switch that handles only TCP/IP traffic. The obvious disadvantage of a switch fabric hardwired to handle a specific protocol is lack of flexibility. Service providers want to sell services to a variety of customers in various industries. Protocols vary from industry to industry.

Even within one protocol type, there can be protocol upgrades. For example, TCP/IP, the machine language of Internet routers, now runs primarily "IPv4." This protocol, successful as it has been, has a lack of available addresses, poor security features, and no "quality of service" (QoS) provisions. The next generation Internet protocol is "IPv6." It provides solutions to these limitations.

A protocol agnostic switch fabric works equally well with all protocol types, however, the traffic manager must be responsible for recognizing specific protocol types. The disadvantage of a protocol agnostic switch fabric is that it may be more complicated, and perhaps slower than a switch fabric dedicated to a particular protocol.

Packet Striping vs. Single Link Per Packet

The simplest way for a traffic manager to transmit a packet into a switch fabric is to transmit the packet serially along one line. Striping is a way of achieving higher bandwidth by transmitting a single packet across multiple ingress/egress lines. For example, a TM can transmit a packet into a switch fabric eight times as fast if the packet is sliced into eight pieces (stripes) by the TM, and conveyed into the fabric along 8 parallel lines simultaneously. The fabric captures the packet in memory, routes it to the required egress destination, and slices the packet into 8 parallel lines before transmitting the packet to the egress TM.

The upside to packet striping is the potential for lower latency. There are several negative aspects of packet striping:

if one of the links is damaged (1 of 8 in the example above), the entire channel is out of service, degrading fault tolerance; and, the interface between the TM and switch fabric is more complicated. Circuitry must be used to slice the packet into stripes and reassemble it into packets.

Single-Cell Packet vs. Multi-Cell Packets

Many switch fabrics now deployed and passing revenue traffic, especially in wide area networks (WANs), use asynchronous transfer mode (ATM) packets. ATM packets are single-cell packets, with a fixed cell size of 53 bytes, 48 bytes of which is the information payload. The ATM specification evolved in the 1980s and early 1990s. It was then believed that variable length (multi-cell) packets would be too difficult to implement at rates needed for wire-speed traffic. The single-cell solution was a compromise that would work for voice data, video data, multimedia data, email data, file data, etc. With a fixed frame size, switch designs are simplified and ultimately faster.

However, files are better sent in large frames. Voice switching performs better with small bursts of data, corresponding to analog-to-digital converter time slots. Large frames and concomitant switching latencies can render a switch useless for most 2-way voice applications. Voice communications require low latency (time delay). Since ATM had to work for all network data, the small payload (voice) requirements prevailed at the expense of the large frame applications.

For large frames or packets it is much more efficient to establish a path from an ingress port card to the required egress destination, and then leave this path undisturbed until the packet is completed. With single cell packets, the ingress port card must bid for, accept grants, and then schedule each cell of a multi-cell packet.

There are also Frame Relay switch fabrics. Frame Relay is a single-cell protocol, albeit with frame size ranging from 6 to 4096 bytes. Such switch fabrics have been deployed and passing revenue traffic since the early 1990s. These switch fabrics have generally not been used for voice data because of the large latency. Only highly compressed voice traffic works well over frame relay. Voice-over-frame relay was added as an afterthought by network engineers. Frame relay excels at data communications such as local area network internetworking (LAN-to-LAN). Such communications are very high speed and bursty, with non-critical latency constraints.

Cut-Through vs. Store-and-Forward

The conventional method of switch fabric packet routing is called Store-and-Forward. In this method, the switch fabric accepts an input packet and buffers the packet on the ingress side of the fabric, making sure the packet was received intact, knowing the exact number of cells in the packet. The problem with the store-and-forward method is the added latency of buffering the packet. In Cut-through Packet Routing (CPR), a switch fabric is able to send the incoming packet cells to the correct egress port as soon as the destination address is known.

Memory-Based vs. Arbitrated Crossbar

A switch fabric can use memory-based crossbars or arbitrated crossbars. A memory-based crossbar is sometimes called a "shared memory switch." Ingress packets flow from the port cards into a huge memory bank, which serve as the switch. From the memory bank, the destination address is determined from egress port destination information in the cell headers. The problem with these switch fabrics is that they become prohibitively expensive and large from all the required high-speed memory. Such fabrics cannot be used to reach terabit total switching speeds with technology available today.

It would be advantageous if a switch fabric could use arbitrated crossbars to reduce the need for high-speed memory.

It would be advantageous if a switch fabric could use Cut-though packet routing to reduce latency.

It would be advantageous if a switch fabric could handle multi-cell packets, so as to switch larger-sized packets with a reduced latency.

It would be advantageous if a switch fabric could use a single-link for each packet, to improve the system fault tolerance and simplify the interface to a TM.

It would be advantageous if the above-mentioned switch fabric could operate protocol agnostic.

It would be advantageous if a switch fabric could gracefully degrade in response to control link failures between port cards and switch cards.

SUMMARY OF THE INVENTION

Accordingly, a system and method are provided for tolerating control link faults in a packet communications switch fabric. The method comprises: accepting information packets including a plurality of cells, at a plurality of port card ports, the plurality of information packets addressing a plurality of port card ports; selectively connecting port card ports to port card backplane data links; in response to backplane control link communications, selectively connecting port card backplane data links and crossbars; sensing a connection fault in a control link; and, in response to sensing the control link fault, reselecting connections between the port card ports and the port card backplane data links.

In some aspects, selectively connecting port card backplane data links and crossbars includes: for a particular backplane data link, fixedly connecting each port card to a corresponding interface of an assigned crossbar; and, selectively enabling the connection to each crossbar.

In some other aspects of the method, fixedly connecting each port card to a corresponding interface of an assigned crossbar includes: assigning an ingress priority queue (iPQ) to a group of data links; and, assigning an arbiter to control a crossbar. Then, selectively enabling the connection to each crossbar includes negotiating between the arbiter and the iPQ for the use of the crossbar. For example, fixedly connecting each port card to a corresponding interface of an assigned crossbar includes fixedly connecting a bid/grant control link between the iPQ and the arbiter to request access to the crossbar for a corresponding channel group of data links.

In other aspects, sensing a connection fault in the control link includes: each arbiter monitoring connected bid links; and, the received bid communications from a iPQ exceeding an error threshold. Further, each iPQ monitors connected grant links for received grant communications from an arbiter exceeding an error threshold.

In some aspects, reselecting connections between the port card ports and the port card backplane data links in response to sensing the control link fault includes reselecting a backplane data link in response to detecting a fault in an associated control link.

Additional details of the above-described method and a switch fabric system for tolerating control link faults are described below.

BRIEF DESCRIPTION OF THE DRAWINGS

FIG. 1 is a schematic block diagram illustrating the present invention switch fabric system for tolerating control line faults.

FIG. 2 is a schematic block diagram illustrating in greater detail the first port card of FIG. 1.

FIG. 3 is a schematic block diagram depicting a switch card.

FIG. 14 is a diagram illustrating link to channel assignments.

FIGS. 22*a* and 22*b* are flowcharts illustrating the present invention method for tolerating control line faults in a packet communications switch fabric.

DETAILED DESCRIPTION OF THE PREFERRED EMBODIMENTS

Figure 4:
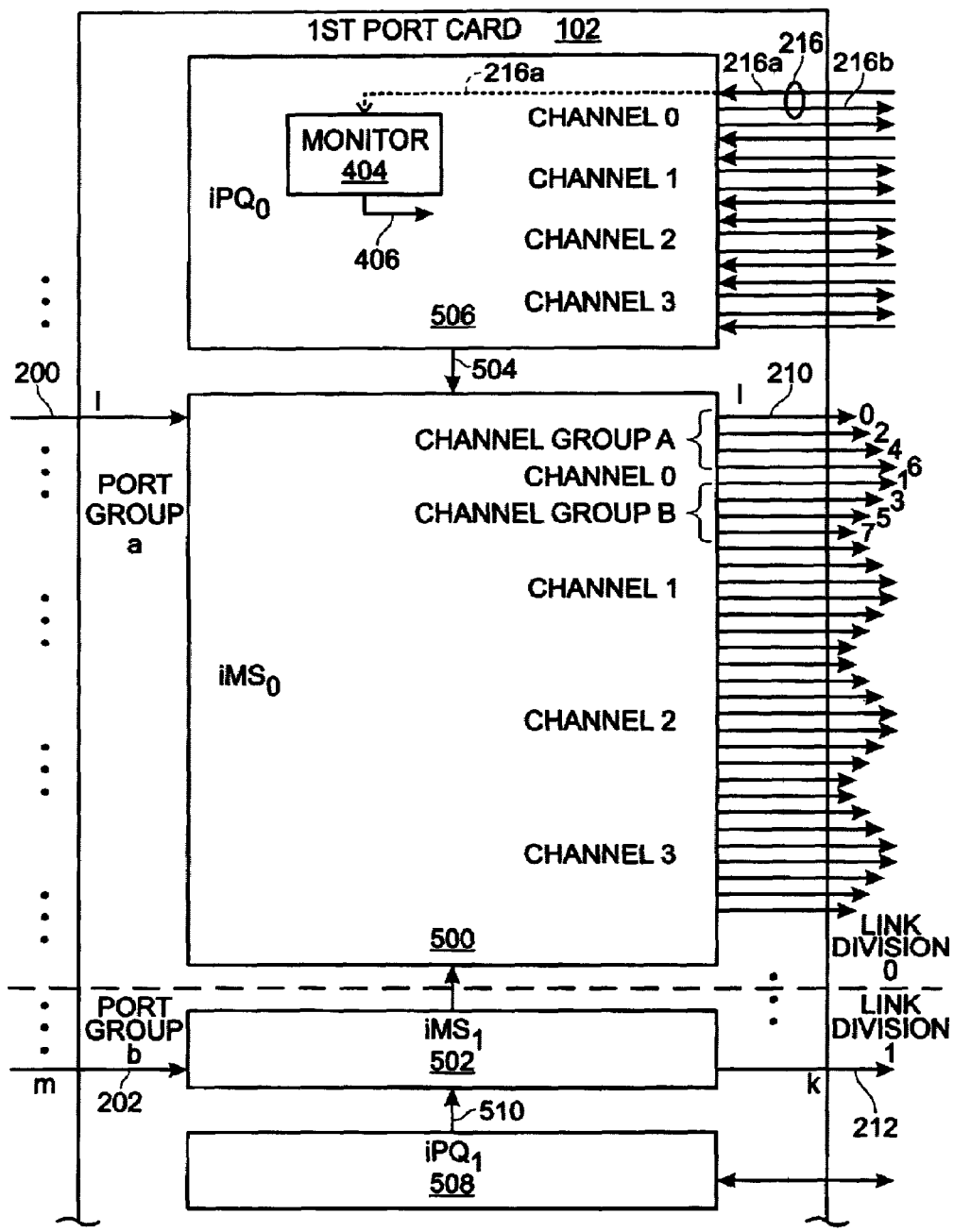
FIG. 4 is a schematic block diagram depicting the ingress portion of the first port card of FIG. 2 in greater detail.

FIG. 1 is a schematic block diagram illustrating the present invention switch fabric system for tolerating control line faults. The system 100 comprises a plurality of port cards. Shown are port cards (PCs) 1 (102) through n (104), where n is undefined. Although the figure specifically depicts two port cards, the system 100 is not limited to any particular number.

FIG. 2 is a schematic block diagram illustrating in greater detail the first port card 102 of FIG. 1. Each port card, as exemplified by the first port card 102, includes a plurality of ports to communicate information packets, including a plurality of cells, with a network (not shown). Shown are ports 1 (on line 200) through m (on line 202), where m is undefined. The first port card 102, however, is not limited to any particular number of ports. Likewise, the first port card 102 includes a plurality of egress ports to supply packets to the network. As explained below, each port card can be configured to exclusively perform either ingress or egress functions, or configured to perform both functions.

A plurality of backplane data links transfer packets between port cards. Shown are backplane data links 1 (one line 210) through k (on line 212), where the value of k is undefined and not limited to any particular value.

The first port card includes at least one ingress priority queue 214 (iPQ) having a port on line 216 to accept error messages associated with faulty signals controlling the inter-port card transfer of packets on the backplane data links. A port is connected to line 218, to reselect inter-port card connections on the backplane data links in response to error messages. As explained in more detail below, iPQ 214 is assigned to a group of backplane data links. As shown, iPQ 214 is associated with backplane data links 1 through k. Also as explained below, the memory subsystem (MS) 220 may either be an ingress MS (iMS) or an egress MS (eMS).

Returning to FIG. 1, at least one crossbar 106 has a control input operatively connected to accept control signals from the iPQ (see reference designator 214 of FIG. 2) on line 108. As used herein, "operatively connected" means indirectly connected or connected through an intervening element. Each crossbar in the system 100, as exemplified by crossbar 106, selectively connects crossbar inputs and crossbar outputs in response to the iPQ control signals. As shown, there are 1 (on line 210) through z (on line 110) crossbar inputs and 1 (on line 112) through y (on line 114) outputs, where the value of z and y are undefined and not limited to any particular value. Typically, however, the value of z is equal to the value of y. In some aspects of the system 100, the value of z is equal to the number of ingress configured port cards, and the value of y is equal to the number of egress configured port cards. If port cards are configured for ingress and egress operation, then is some aspects n=z=y.

The crossbar 106 inputs 210 and 110 are fixedly connected, and selectively enabled, to a backplane data link from each port card. As shown, crossbar input 1 on line 210 is connected to the ingress backplane data link 1 (see FIG. 2). Likewise, the outputs 112 and 114 are fixedly connected to port card egress backplane channel links from each port card. The fixed connections are selectively enabled, as described below.

FIG. 3 is a schematic block diagram depicting a switch card. Each switch card, as exemplified by switch card 300, includes an arbiter 302 assigned to each crossbar (Xb) on line 304. As shown, the arbiter 304 is connected to Xb0 (306), Xb2 (308), Xb4 (310), and Xb6 (312). However, the switch card 300 is not limited to any particular number of crossbars. The arbiter has a port connected to each iPQ to negotiate for the use of the crossbar and a port connected to supply commands to the crossbar control input. As shown, the arbiter 302 is connected to the first port card iPQ on line 216. The arbiter is connected to the nth port card on line 314. Each of the crossbar inputs are selectively enabled to crossbar outputs in response to commands received at the control input on line 304.

Considering FIGS. 2 and 3 in greater detail, it can be seen that each backplane control link, control link 216 for example, includes separate bid and grant control links on lines 216*a* and 216*b*, respectively. In other aspects of the system not shown, the bid and grant communications are multiplexed on a common control link. The iPQ 214 has a bid control link connected to the arbiter 302 on line 216*a* to request access to a crossbar, crossbar 306 (Xb0) for example. The iPQ 214 has a grant control link connected to the arbiter 302 on line 216*b* to receive crossbar grants from the arbiter 302.

As shown in FIG. 3, switch card 300 includes a third plurality of crossbars controlled by the arbiter 302. In this example the third plurality is equal to 4, but the invention is not limited to any particular number of crossbars pre switch card. Using crossbar 306 (Xb0) as an example, each crossbar input, 1 (line 210) through z (line 110) is connected to a particular backplane data link from each port card. For example, crossbar 306 (Xb0) is connected to ingress backplane data link 1 of the first port card, the nth port card, and any other port card in the system (not shown). Then, crossbar 308 (Xb2) could be connected to ingress backplane data 2 from each port card in the system, crossbar 310 (Xb4) connected to ingress backplane data link 3, and so forth. Again using crossbar 306 as an example, each crossbar output 1 (line 112) through y (line 114) is connected to a particular backplane data link from each port card.

FIG. 4 is a schematic block diagram depicting the ingress portion of the first port card 102 of FIG. 2 in greater detail. Using the first port card 102 as an example, each port card includes a second plurality of backplane data links, separated into a fourth plurality of link divisions. As shown, the fourth plurality is equal to 2 (link division 0 and link division 1), but the invention is not limited to any particular number of link divisions per port card. Each link division includes a seventh plurality of data channels. Using link division 0 as an example, data channel 0, data channel 1, data channel 2, and data channel 3 are shown. However, the seventh plurality need not necessarily be the value 4.

Each data channel includes a fifth plurality of data channel groups. Using data channel 0 as an example, data channel group A and data channel group B is shown. Although the fifth plurality is depicted as 2 in this example, the invention is not limited to any particular value. Each data channel group includes a third plurality of data links. Data channel group A is shown including data link 0, data link 2, data link 4, and data link 6. Data channel group B includes data link 1, data link 3, data link 5, and data link 7. Again, the third plurality need not be any particular value, however, as explained in more detail below, the number of data links in a data channel group is typically equal to the number of crossbars per switch card.

Each port card includes a fourth plurality of iPQs. Shown are iPQ0 506 and iPQ1 508. Each iPQ assigned to a link division. As shown, iPQ0 506 is associated with link division 0 and iPQ1 508 is associated with link division 1. Again, the fourth plurality is not limited to any particular value, but the number of iPQs per port card is typically equal to the number of link divisions per port card. Each port card includes a seventh plurality of control channels corresponding to the data channels. For example, control channel 0 is associated with data channel 0. Each control channel includes a fifth plurality of control channel groups corresponding to the data channel groups. Using channel 0 as an example, control channel 0/control channel group A is associated with data channel 0/data channel group A. Each control channel group includes a bid/grant control link to negotiate crossbar access for a corresponding third plurality of data links.

Returning to FIG. 3, the arbiter 302 includes a monitor 316 with an input to accept requests on the bid link, bid link 216*a* for example, and an output connected to the corresponding grant link to send error messages to the iPQ on line 216*b* when the bid communications exceed an error threshold. The monitor 316 monitors every bid link connected to the arbiter 302. In this manner, faulty control links are detected. Then, the iPQ reselects intra-port card connections between ports and the backplane data links in response to receiving the error messages on line 318*b*.

Returning to FIG. 4, the iPQ0 506 includes a monitor 404 with an input to accept grants, on line 216*a* for example, and an output on line 406 connected to generate error messages. The error messages can be delivered to the arbiter on line 216*b*, for example, when the grant communications exceed an error threshold. The monitor 404 monitors every grant link connected to iPQ0 506. Again, the iPQ0 506 reselects intra-port card connections between ports and the backplane data links in response to the error messages on line 406.

Using the first port card 102 as an example, each port card accepts packets on a sixth plurality of ingress data links 200 through 202 through a corresponding sixth plurality of port card ingress ports 1 through m, separated into a fourth plurality of ingress port groups. Shown are port group a and port group b. Again, the fourth plurality is not limited to any particular value, but the number of ports groups is typically equal to the number of link divisions.

Each port card further comprises a fourth plurality of port card ingress memory subsystems (iMSs) corresponding to the fourth plurality of ingress port groups. Shown are iMS0 500 associated with link division 0 and iMS1 associated with link division 1. Each iMS has inputs connected to the ingress ports 1 through m. iMS0 has an input on line 504 to accept intra-port card transfer commands from the PQ 506 and outputs connected to the backplane data links. The iPQs include a fourth plurality of iPQs corresponding to the fourth plurality of iMSs and fourth plurality of link divisions. Shown are iPQ0 506 and iPQ1 508. iMS1 502 accepts intra-port card transfer commands from iPQ1 508 on line 510.

Figure 5:
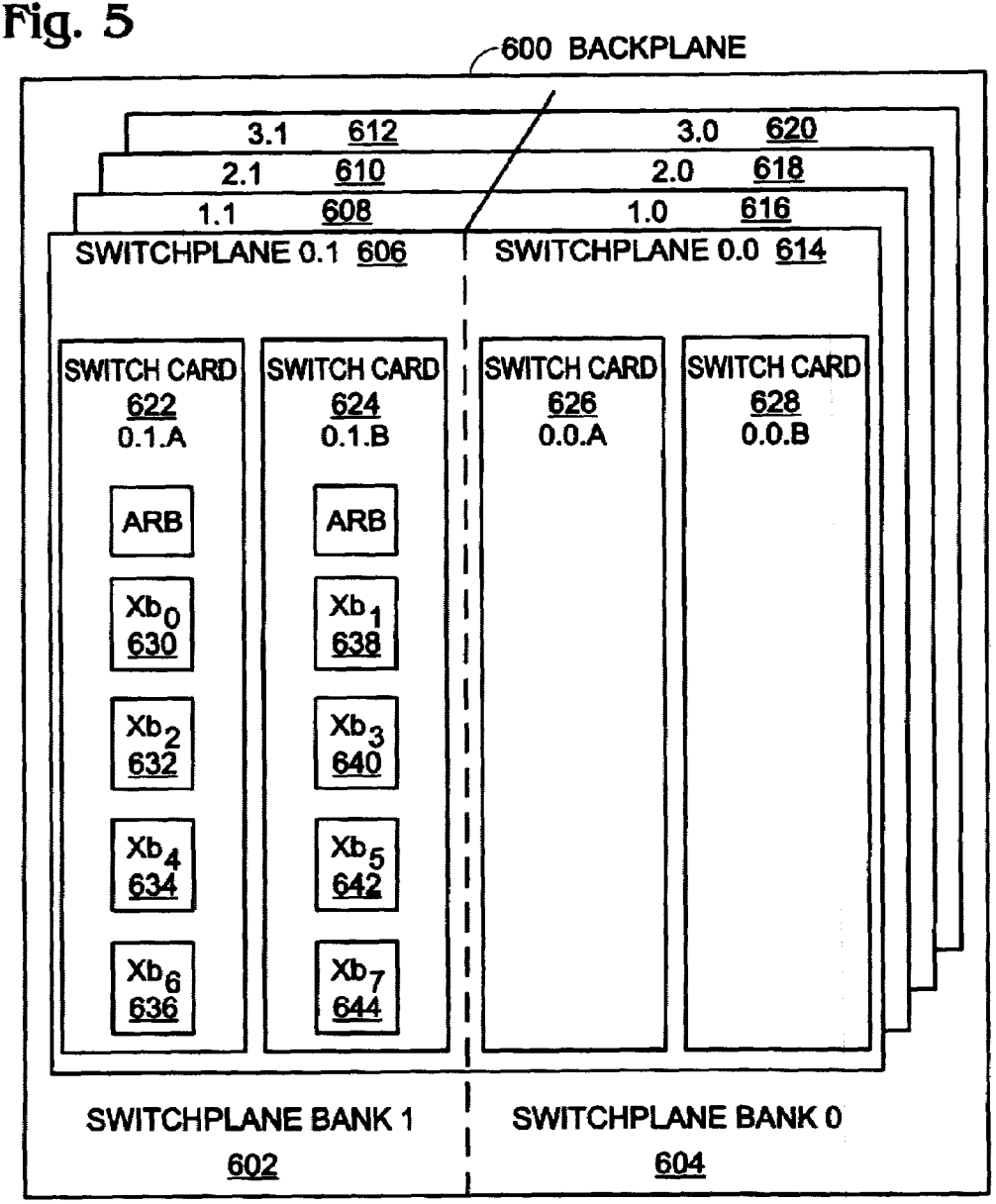
FIG. 5 is a schematic block diagram of the switch fabric backplane.

FIG. 5 is a schematic block diagram of the switch fabric backplane. The backplane 600 includes a fourth plurality of switchplane banks per backplane. Shown are switchplane bank 1 (602) and switchplane bank 0 (604). Each switchplane bank corresponds to a link division and including a seventh plurality of switchplanes. Switchplane bank 1 (602) includes switchplane 0.1 (SP 0.1) labeled 606, SP 1.1 (608), SP 2.1 (610), and SP 3.1 (612). Switchplane bank 0 includes SP 0.0 (614), SP 1.0 (616), SP 2.0 (618), and SP 3.0 (620). Each switchplane corresponds to a channel and includes a fifth plurality of switch cards. SP 0.1 (606) includes switch cards 0.1A (622) and 0.1B (624). SP 0.0 (614) includes switch card 0.0A (626) and 0.0B (628). Each switch card corresponds to a channel group and including a third plurality of crossbars. For example, switch card 0.1A includes crossbars Xb0 (630), Xb2 (632), Xb4 (634), and Xb6 (636). Switch card 0.1B includes Xb1 (638), Xb3 (640), Xb5 (642), and Xb7 (644). As mentioned above, each crossbar corresponds to a particular backplane data link.

Figure 6:
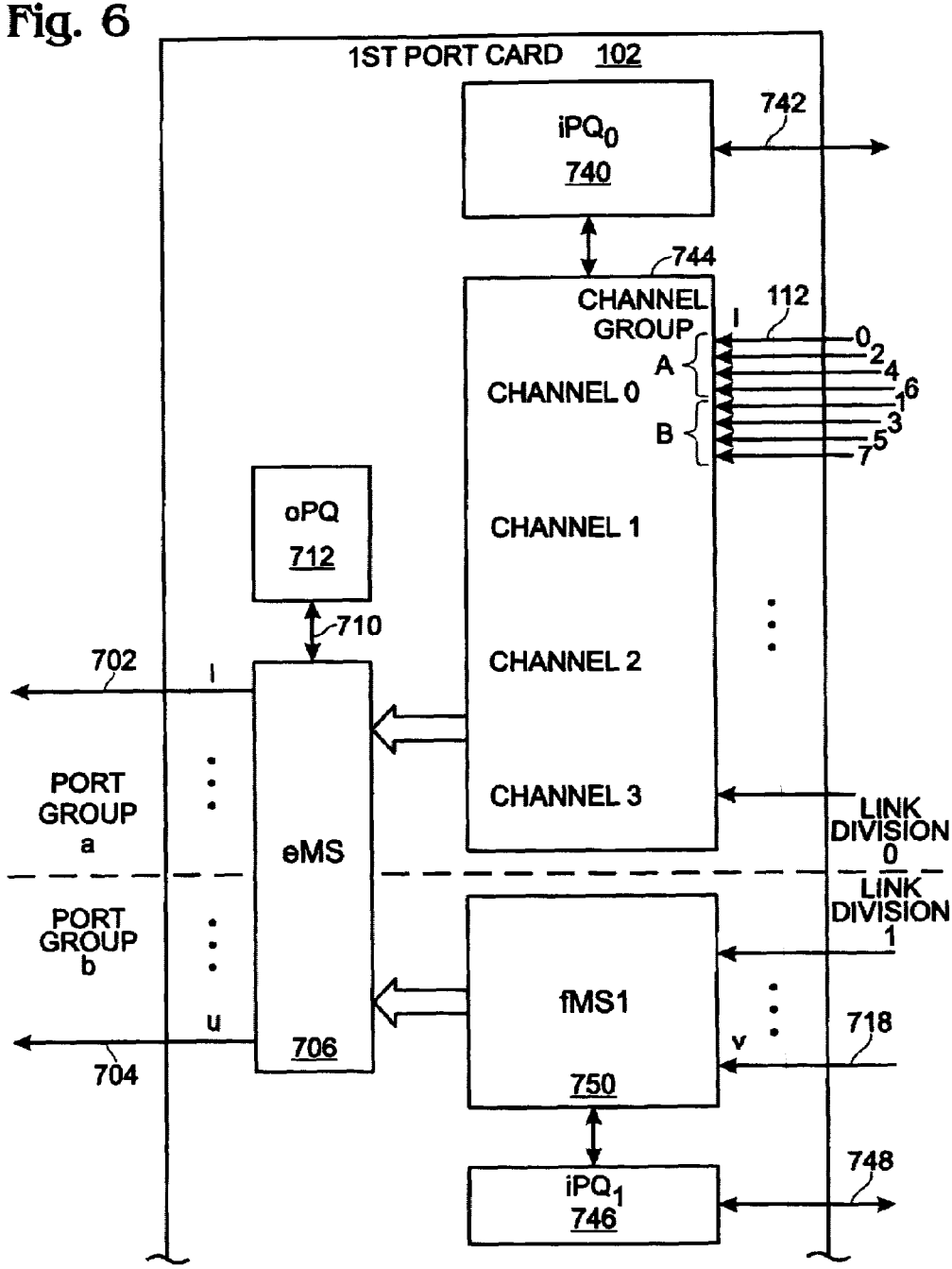
FIG. 6 is a schematic block diagram of the first port card depicting the egress function.
Figure 7:
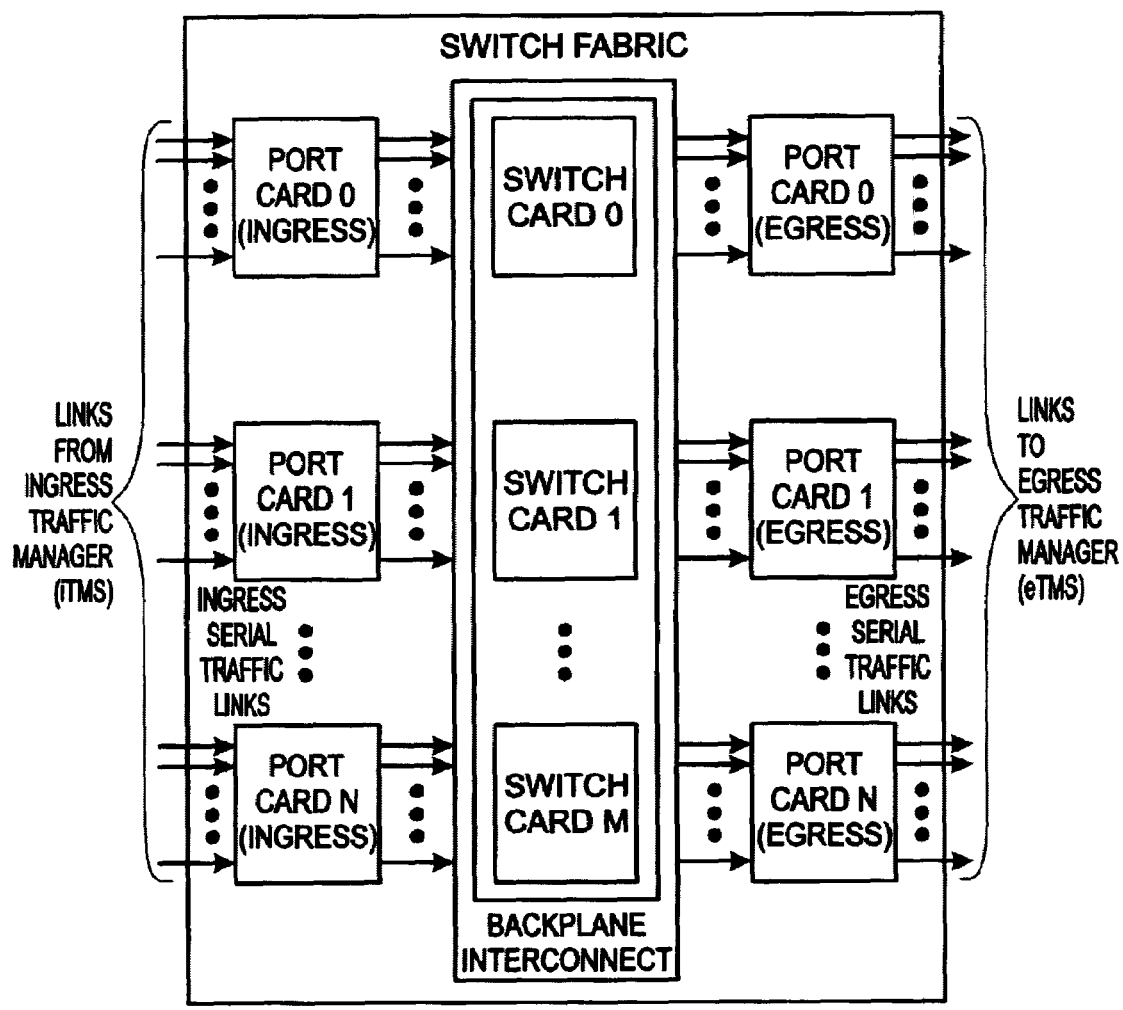
FIG. 7 is a schematic block diagram of a general switch fabric system (prior art).

FIG. 6 is a schematic block diagram of the first port card 102 depicting the egress function. Using the first port card 102 as an example, each port card supplies packets on a sixth plurality of egress data links 702 through 704 through a corresponding sixth plurality of port card egress ports 1 through u separated into a fourth plurality of egress port groups. Shown are port groups a and b, where port group a is associated with link division 0 and port group b is associated with link division 1.

Each port card further comprises an egress memory subsystems 706 (eMS) with outputs connected to the fourth plurality of egress port groups. eMS 706 has an input on line 710 to accept egress port commands from egress PQ (oPQ) 712. Note that the oPQ may function as a priority queue device, earliest deadline first queue (EDFQ), or a field programmable gate array (FPGA) device in different aspects of the invention. eMS 706 has inputs to egress backplane data links 1 through v on lines 112 through 718. In some aspects as shown, a fourth plurality of FIFO MSs (fMSs), not shown, are interposed between the eMS 706 and the egress backplane data links.

As mentioned above, the iPQs are separated into a fourth plurality of iPQs corresponding to the fourth plurality of link divisions. Therefore, the control communications to the egress port card are still segregated by link division, even though there is only one eMS. iPQ0 740 has a control link on line 742 for managing egress backplane (inter-port) data links. iPQ0 740 is associated with fMS 744. Likewise, iPQ1 746 has a control link on line 748, and is associated with fMS 750. For example, a control message associated with link division 0 will be communicated via iPQ0 740.

With respect to either an ingress or egress function of a port card (see FIGS. 4 and 6), the iPQ ceases scheduling packet communications between the MS the backplane data link associated with the faulty control link. That is, the iPQ ceases scheduling packet communications between the iMS and the ingress backplane data link associated with the faulty control link if a faulty ingress control link is detected. Likewise, the iPQ ceases to schedule packets between the eMS and egress backplane data links if a faulty egress control link is detected. Further, the iPQ distributes packet communications between the MS (iMS or eMS) and a first group of backplane data links in response to receiving a faulty control link associated with a second group of backplane data links. For example, if either iPQ0 506, or an arbiter connected to the iPQ0 506, detects a faulty control link between the iPQ0 506 and the arbiter, associated with control channel 0/control channel group A for example, then the iPQ0 506 ceases to schedule packets on data channel 0/data channel group A. Instead, the packets are scheduled in other channels (channel 1, 2, or 3), or in other channel groups of channel 0 (channel group B).

Typically, the iPQ(s) is responsible for monitoring grant control links for both the ingress and egress port card functions. Only the iPQ ever monitors grant links. The oPQ always keeps its bid/grant links powered down. If the iPQ detects a bad grant link, it sets an error flag in the bid link to the arbiter. The arbiter then sets a status flag for the firmware to read. In the case of bid and grant links, however, the link always has a chance to "come back into service." Control links are too precious to simply take out of service like data links. If a grant link appears bad, but then looks good 10 ms later, it's put back in service. The bid and grant links have parity checks on various fields within the bid and grant frame, so as to make the best use possible of a "wounded", but alive link. Fields which pass parity can be used even on a link that is partially working.

With respect to FIGS. 1, 3, 4, and 6, in some aspects of the system 100 the plurality of port cards include a first plurality (n) of combination ingress/egress port cards. Then, each crossbar has a first plurality of inputs (z) and a first plurality of outputs (y), so that (n=z=y). The first plurality is not limited to any particular value.

Although the first through seventh pluralities listed above are not limited to any particular value, there may be relationships between the different pluralities. In one aspect of the system, the first and sixth pluralities are a maximum number of 32, and the second plurality is a maximum value of 64. The third and seventh pluralities are a maximum value of 4, and the fourth and fifth pluralities are a maximum value of 2. Note that less than the maximum values may be used. For example, a crossbar with 32 inputs may only be connected to 31 different port cards.

Functional Description

The Applied Micro Circuits Corporation (AMCC) S8005 Cyclone™ series is a specific embodiment of the above-described present invention series. The Cyclone series is a highly integrated, low power, area efficient chip set that implements a high-capacity switching fabric that seamlessly handles both packet and TDM (time division multiplexed) traffic. Details of this specific embodiment are presented below to clarify some of the system aspects described above. The switch fabric processes all types of packet traffic (ATM, MPLS, IP, etc.). The system switch fabric is based on a set of four highly integrated ICs which contain SERDES and memory in order to reduce the overall system power, routing complexity, and required board area. The chip set consists of the following chips:
S8505 Priority Queue (PQ);
S8605 Arbiter/Crossbar;
S8805 Earliest Deadline First Queue (EDFQ); and,
S8905 Memory Subsystem (MS).

The port cards described above could be a single device including the PQ, MS, and EDFQ chip functions.

The Cyclone switch fabric implementation is "protocol agnostic," meaning the chips can process all types of packet traffic (Fibre Channel, ATM, MPLS, IPv4, IPv6, etc.) equally well. The focus of the Cyclone system is to optimize switching performance in terms of throughput, latency, switch capacity, and scalability.

Generally, the Cyclone fabric does not use striping. It does support a striped cell format (ViX-v3) when used in conjunction with certain traffic managers. However, even when the Cyclone fabric used ViX-v3 packets at the ingress or egress, the routing of the packets through the crossbars is still done along a single link per packet.

Cyclone solves the problems associated with ATM and Frame Relay by using fixed frame size (64 byte or 80 byte cells, constant for each switch fabric). For extremely low latency voice applications, such as voice over IP (VoIP), packets consist of one or two cells. For high speed data communications, packet sizes can be as large as 192 cells (15,360 bytes if 80-byte cells are used). In either case, the fixed cell size allows the fabric to be fast. Because the Cyclone solution is "cut-through", latency is kept to an absolute minimum.

The Cyclone method of cut-through packet routing minimizes latency. Service providers have delay budgets and often need to be able to offer very low latency to certain customers. A store-and-forward approach simply would not meet these needs. The only downside to cut-through switching is it places the additional burden of packet integrity checking on the traffic managers. This is usually handled by means of a cyclic redundancy check (CRC). The iTM calculates the required CRC byte(s) based on the data in a packet. The CRC is recalculated by the eTM to verify correct transmission.

The arbitrated crossbar method, used in the Cyclone system, is more complicated because it requires a centralized arbitration mechanism. But this method allows better scaling of the switch fabric from a small 20 Gbit/sec fabric to a large 1.2 Gbit/sec system.

Figure 8:
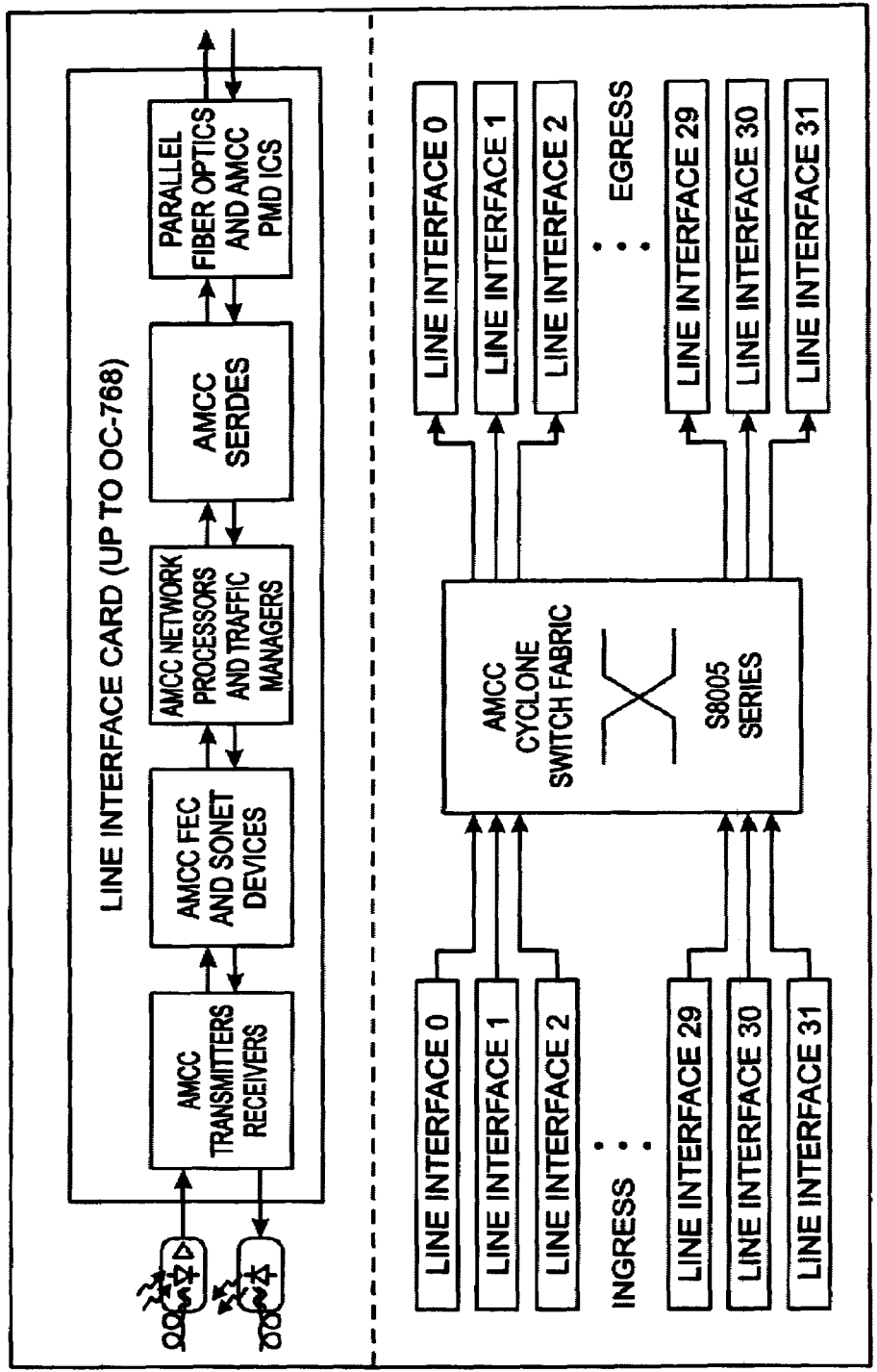
FIG. 8 is a schematic block diagram depicting a packet communications network utilizing the present invention switch fabric.

FIG. 8 is a schematic block diagram depicting a packet communications network utilizing the present invention switch fabric. Traffic management is integrated into the switch fabric and occurs at the ingress, switching, and egress in order to guarantee quality of service (QoS). The switch fabric is scalable and can terminate up to 128 OC-192's (1.28 Tbps). The system can be organized as a 32×32 port switch where each port consists of four OC-192 channels, in effect implementing a 128×128 switch. The OC-192's can be either channelized or concatenated. The fabric can also be thought of as a 512×512 switch since each channel can be treated as four OC-48 subchannels. In addition to the port cards, there are up to 16 switching cards (depending on the chosen architecture and organization), which consist of arbiters and crossbars. Each switching card has connections to all the port cards.

All traffic is cellularized, whether TDM or best-effort type traffic. The interface into and out of the switch fabric passes cells over 2.5 Gbps serial links, which include 8B/10B encoding. Each channel of the switch fabric consists of up to ten serial links, providing up to 20 Gbps data rate throughput.

Port cards provide the traffic interface into the switch fabric. Port cards can be architected such that the line interface (optics, Phy.'s, framers), network processing, and traffic management are on the same card, or they can be architected to be on separate cards. A port card's configuration is dependent on the desired chassis architecture and the number of chips needed.

The three basic types of port cards are single channel (10G or OC-192), two channel (20G or 2×OC-192), and four channel (40G or 4×OC-192). The different types of port cards are normally not mixed in the same chassis because the backplane and switch cards would have to be built to support the largest case. When all of the cards are of the same type, there are optimizations that can be done (depending on the required bandwidth), to reduce the number of switch cards or crossbars on those cards, and hence the number of traces on the backplane.

Figure 9:
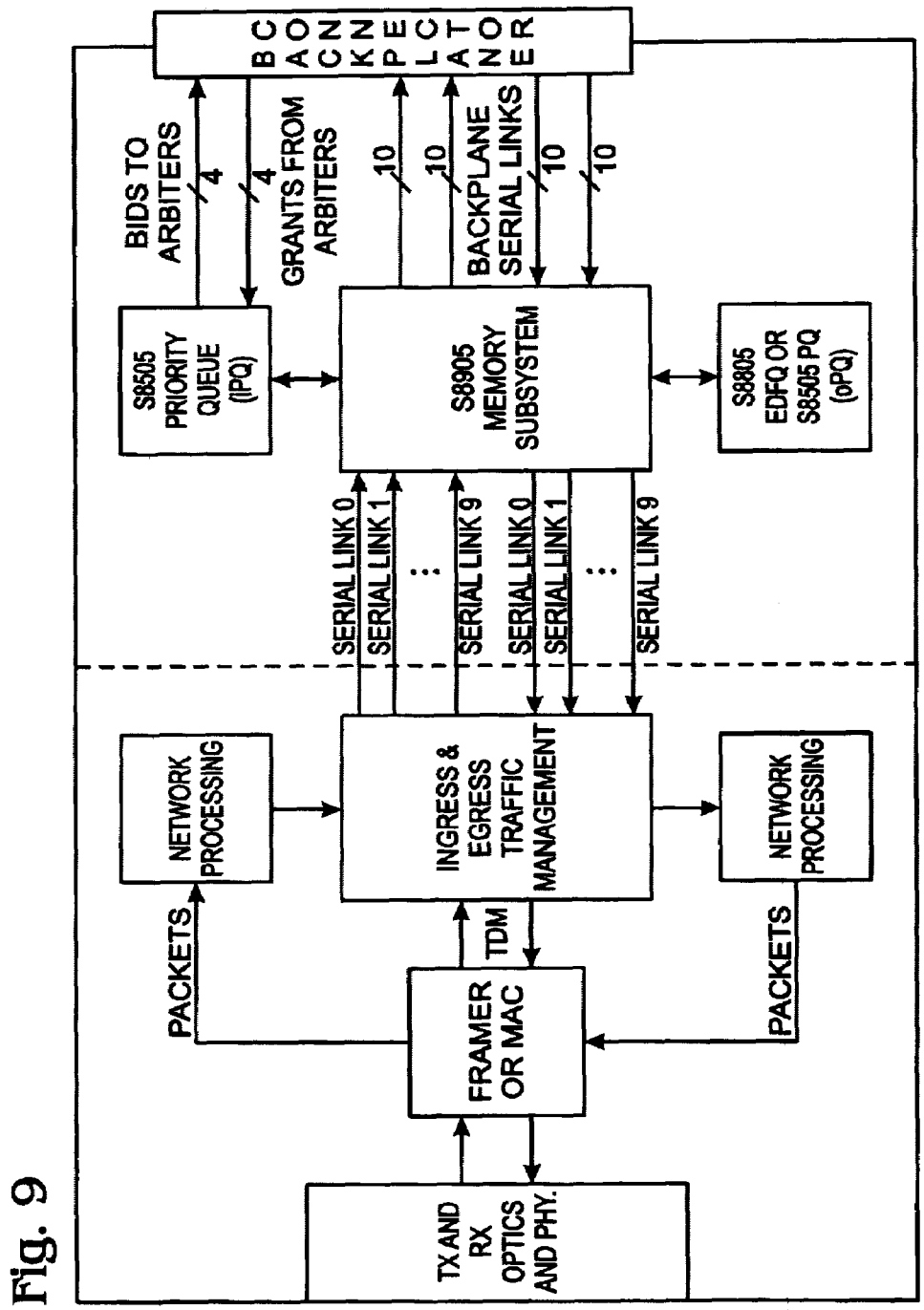
FIG. 9 is a schematic block diagram depicting an example of a single channel port card with all the necessary line functions on a single card.

FIG. 9 is a schematic block diagram depicting an example of a single channel port card with all the necessary line functions on a single card. Packet or best-effort traffic travels through the network processor (NP) and ingress traffic manager (TM) before being sent to the fabric. TDM traffic goes directly from the framer to the TM if it can handle TDM traffic, otherwise it goes to a cellification device, which would then interface to the TDM provisioned links. 10 links are being used on the line ingress and line egress sides of the Memory Subsystem (MS). Having 10 links implies the use of 80-byte Cyclone cells; only 8 links can be used when using a 64-byte cell size. The system description of FIGS. 1 through 12, above, is based upon the use of a 64-byte cell. However, as presented below, the same system elements and processes are used for managing 80-byte cells. The 8 and 10 links represent the maximum number of links that can be used for their respective cell sizes. There is nothing preventing the use of fewer links if they are all that is needed.

The ratio between the number of line ingress links and the number of links carrying data to the backplane gives the backplane speedup for the system. In this example, there are 10 ingress links into the MS and 20 links (2 backplane channels) carrying that data to the backplane. This gives a backplane speedup of 2×. As another example, with 8 ingress links and 12 backplane links, there is a speedup of 1.5×. It should be noted that in addition to the backplane speedup, there is also an ingress/egress speedup. With 10 ingress links capable of carrying 2 Gbps each of raw data, this presents a 20 Gbps interface to the MS. An OC-192 only has approximately 10 Gbps worth of data. Taking into account cell overhead and cell quantization inefficiencies, there still remains excess capacity in the links.

Figure 13:
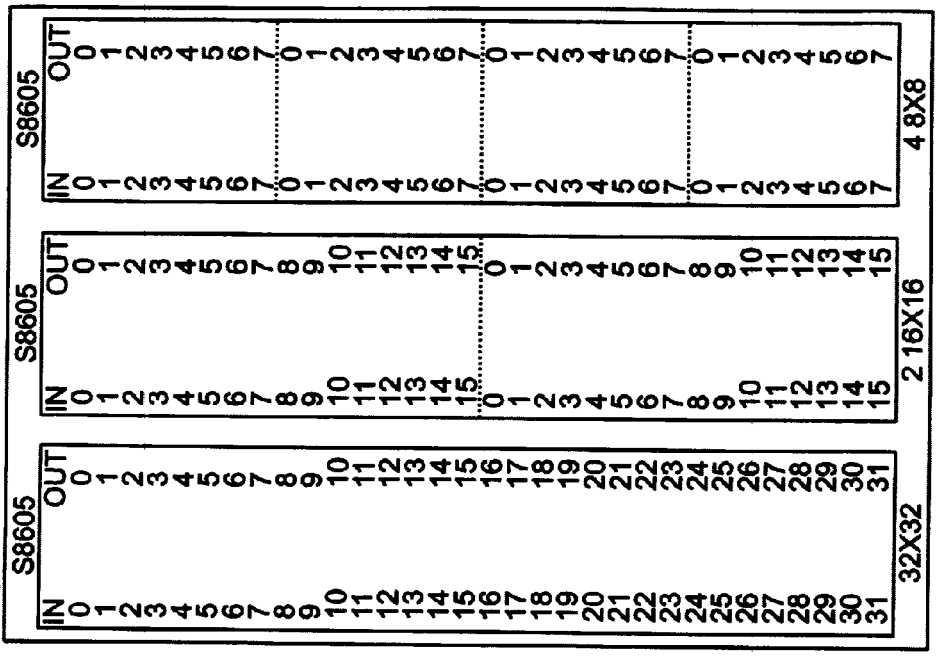
FIG. 13 is diagram illustrating different crossbar configurations.

The S8505 iPQ shown in FIG. 13 has all 4 bid and grant links shown. In a 32×32 system with all the cards being single channel cards (320 Gbps), only 4 of the links would need to be used, as described in detail below.

Figure 10:
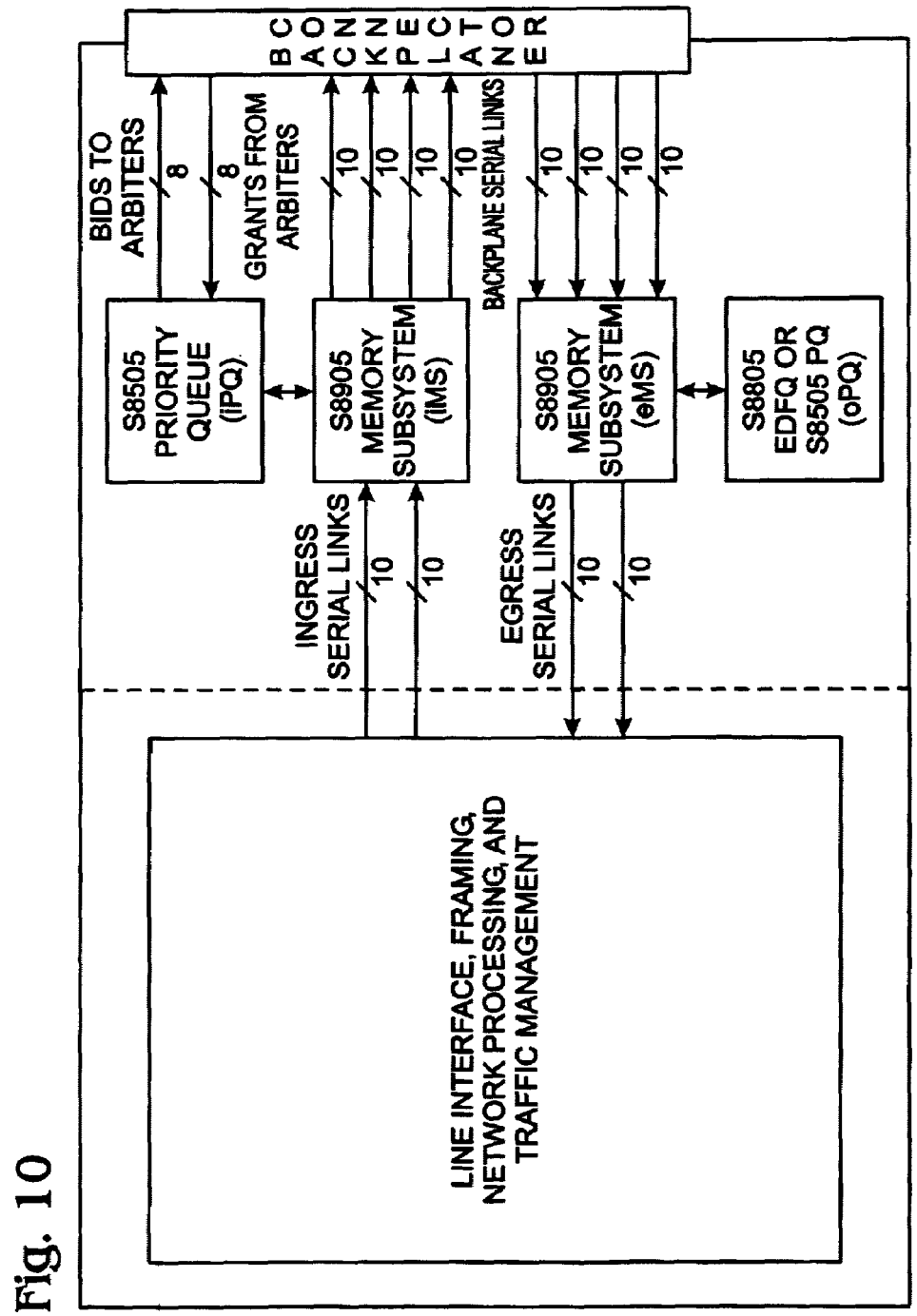
FIG. 10 is a schematic block diagram exemplifying a 2-channel port card.

FIG. 10 is a schematic block diagram exemplifying a 2-channel port card. The only difference between the previous example and this one is the addition of an extra MS. In the single-channel case, one MS takes care of both ingress and egress buffering. In the two-channel case, an additional MS is required in order to provide the number of serial links necessary to function and still have a speedup. Note that the single-channel card can be used as a two-channel card by enabling 10 more ingress and egress links, but there would be no backplane links left to create a speedup.

Just as in the single-channel case, the number of usable links is related to the cell size, and the number used can always be less than the total allowed for that cell size. If the two-channel card of FIG. 14 were used in a 32×32 system (640 Gbps) where all the cards were the same, then all eight links on the PQ would be required for bids and grants. If a 16×16 system of these cards (320 Gbps) were created, then only 4 of the iPQ links would be necessary.

Figure 11:
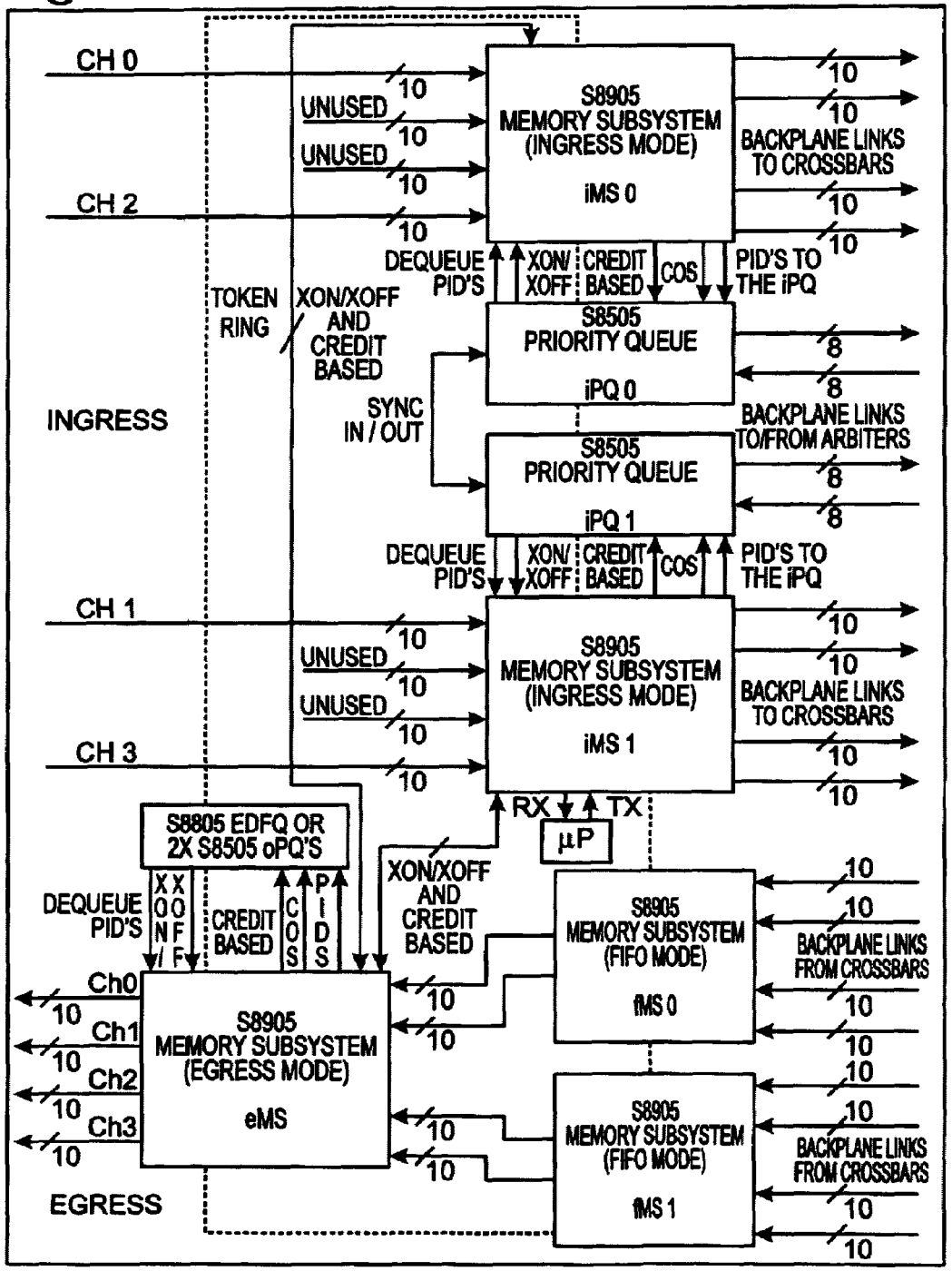
FIG. 11 is a schematic block diagram depicting an example architecture of a 4 channel (OC-768) port card.

FIG. 11 is a schematic block diagram depicting an example architecture of a 4-channel (OC-768) port card. The configuration shown is different than the previous ones shown (FIGS. 9 and 10) in terms of chip counts and functional partitioning. To begin with, instead of having the line interfaces, framers, network processors, and traffic management on the port card, there is a connector. The connector is used because of size constraints, or to customize the system. For instance, it may be desirable to have one channel be fibre channel, the second be 10 Gb Ethernet, the third SONET, and the fourth MPLS.

The number of chips required to support 4 channels is also larger. As shown in the two-channel port card (FIG. 10), it requires an entire MS to support two ingress channels and still have backplane speedup, so in the 4-channel case it is logical that another MS and iPQ would be required. It should be noted that the odd ingress channels are defined on one MS and the even channels on the other. This is done for memory access reasons and also has to do with how links are serviced. The first link that is serviced is in channel 0, 8 ns later a link in channel 1 is serviced, 8 ns after that a link in channel 2 is serviced, followed by a link in channel 3, 8 ns later. Then, 8 ns later the next link in line from channel 0 is serviced (32 ns after the previous link from channel 0 was serviced). This process continues, and does not return to the starting link in channel 0 until all the links have been serviced.

Similar to the previously described port cards, the maximum number of links per channel is set according to the cell size, but fewer links can always be used. The number of links used by each channel does not have to be symmetric. This may be desirable in order to decrease the number of traces, but the time slots allocated to pass data through those links will still be reserved. Since there are now two iPQs in the system, there are a total of 16 links that can be used for bids and grants. In a 32×32 system where all the cards are 4 channels (1.28 Tbps), all 16 links would be necessary. In a 16×16 4-channel system (640 Gbps), only half as many would be required, 4 per iPQ.

The egress side of the 4-channel port card has 3 MSs. A 2× backplane speedup with 4 channels requires 80 links entering the egress side. To terminate 80 links requires 2 MSs, since each MS has 40 links. These two MSs (fMSs) send the traffic to the third MS (eMS) in FIFO order. Scheduling cannot be performed at this point since the scheduler has to be aware of the packets in both MSs. For this reason, and to provide channel multicast, all the traffic must be funneled into a single MS. This removes the backplane speedup and presents a standard 4-channel interface to the egress traffic manager.

Figure 12:
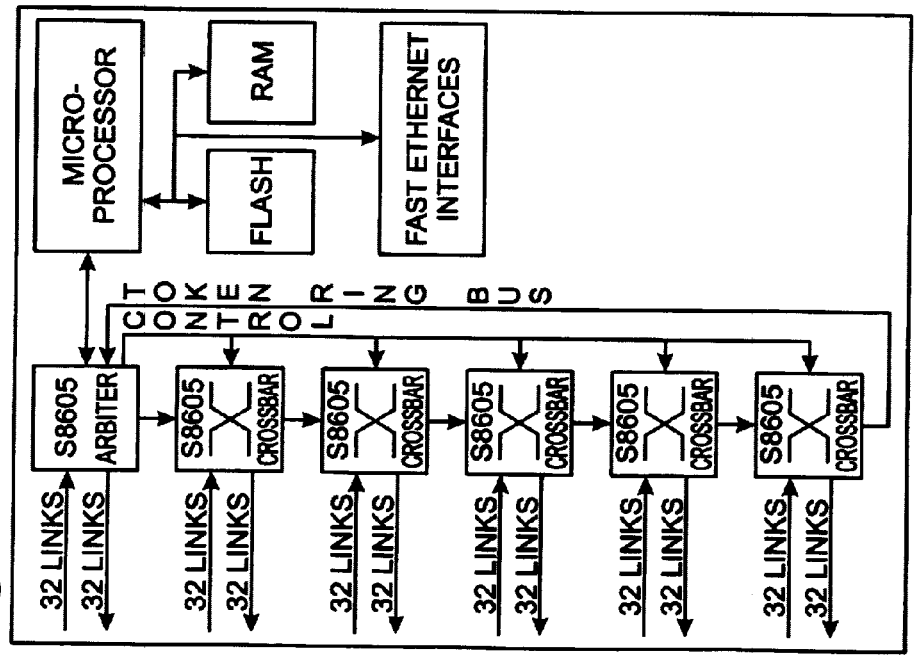
FIG. 12 is a schematic block diagram depicting a switch card.

FIG. 12 is a schematic block diagram depicting a switch card. Switch cards are responsible for connecting the different port cards together to deliver traffic from ingress to egress. The arbiter on the switch card performs a maximal matching algorithm that establishes as many backplane connections as possible to maintain the highest throughput. Each switch card acts independently to service the links attached to it.

A switch card typically has a single arbiter and a number of crossbars. An arbiter can control a maximum of five crossbars. Through the arbiter, a microprocessor can access the crossbar and arbiter registers as well as all the Cyclone chips on all the port cards.

Figure 17:
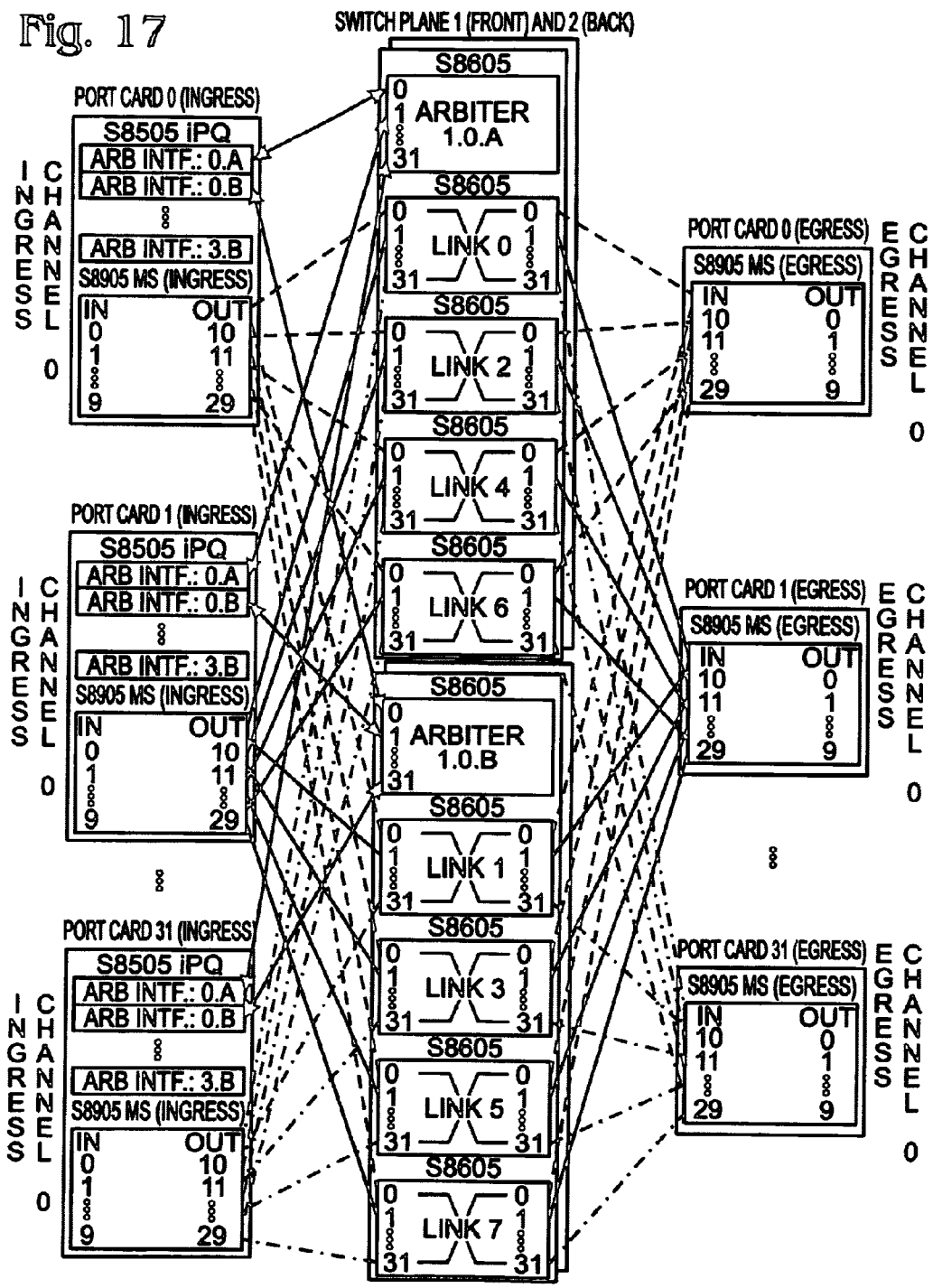
FIG. 17 is a schematic block diagram illustrating a 32×32 single channel system, using 8 links per channel, with a 2× backplane speedup.

FIG. 13 is diagram illustrating different crossbar configurations. A fully populated 32×32 port card system can include up to 16 switch cards. The number of crossbars required on a switch card is dependent on the number of links being output by a channel on the backplane (or the backplane speedup). For example, if a backplane channel (no relation to input channels) has 10 links, then 10 crossbars would be required to service it. Links attachments to the switch cards are dependent upon the number of port cards in a system and the arbiter configuration. The arbiter can be configured to treat each of the crossbars as 4 8×8 crossbars, 2 16×16 crossbars, or a single 32×32 crossbar as shown in FIG. 17. The arbiter mode, and hence the crossbar treatment, is dependent on the maximum number of port cards in the switch fabric.

The iPQ device may include 1024 queues. These queues are grouped together to create up to 8 class of service (COS) queues which when taken together form virtual output queues (VOQs). The number of queues available for creating different COS levels is dependent on the output port granularity and the number of port cards in the system. For example, if the number of port cards in a system is 32, with 4 egress channels per port card, there would be 1024/(4× 32)=8 COS queues available for each VOQ. Taking the same case but using 4 subchannels per channel, there would only be 2 COS queues available for each VOQ. However, if the number of cards were reduced to 16, then there would be 4 COS queues for each VOQ. The equation to calculate how many COS queues are available is summarized as:

Available # of COS queues per VOQ=(Total # of queues)/(# of Port Cards×# of Channels×# of Subchannels).

The number of COS's per VOQ can never be greater than eight.

FIG. 14 is a diagram illustrating link to channel assignments. The MS provides the interface between the line side and the fabric. As mentioned previously, the ratio between the number of backplane links used and the number of ingress/egress links used sets the speedup of the fabric. Each MS has 40 input/output data links which can be used. Every 10 links create a channel, whether it is a backplane channel or an ingress/egress channel. There is no logical relationship between backplane and ingress/egress channels. A packet that arrives on one link can, in general, leave on any other link.

The number of links used in a channel is programmable. Unused links are powered down for power savings. The maximum number of links that can be used in a channel is based on the chosen cell size. When 80-byte cells are used, up to 10 links can be used. When 64-byte cells are being used, only up to 8 links can be used. The unused links would be the ones shown below the dashed lines (the 8th and 9th link of each channel) in FIG. 14.

An 8–10 link channel can be used to transport an OC-192 worth of data traffic. A channel can also be treated as a group of OC-48 subchannels. When subchannels are enabled, the link to subchannel mapping would be organized as shown in Table 1. This organization would repeat for all the ingress/egress channels. The links of a channel are serviced in round robin order starting at link 0. In general, the time between links is 32 ns. Note that a backplane channel, regardless of whether the ingress/egress channels have subchannels enabled, is always treated as a channel sized entity.

TABLE I

MS Link to Subchannel Mapping for Ingress/Egress Channels using Cyclone Native Cell Format

| Physical Link # | Subchannel # | Subchannel Link # |
|---|---|---|
| 0 (10) (20) (30) | Subchannel 0 | 0 |
| 1 (11) (21) (31) | Subchannel 1 | 0 |
| 2 (12) (22) (32) | Subchannel 2 | 0 |
| 3 (13) (23) (33) | Subchannel 3 | 0 |
| 4 (14) (24) (34) | Subchannel 0 | 1 |
| 5 (15) (25) (35) | Subchannel 1 | 1 |
| 6 (16) (26) (36) | Subchannel 2 | 1 |
| 7 (17) (27) (37) | Subchannel 3 | 1 |
| 8 (18) (28) (38) | Subchannel 0 | 2 |
| 9 (19) (29) (39) | Subchannel 1 | 2 |

Since all links must be serviced in one cell time, it is easy to see why more links can be serviced when a longer cell is used. A 64-byte cell takes 256 ns to be received at 2.5 Gbps. (256 ns)/(32 ns/link) gives enough time for 8 links. An 80-byte cell takes 320 ns to be received at 2.5 Gbps. (320 ns)/(32 ns/link) gives enough time for 10 links. For 64-byte cells, links 8 and 9 of each channel shown in Table 1 would not be used.

Table 2 and Table 3 show ViX-v3 cell format mappings, which are for 64-byte cells only. Since ViX-v3 cells are striped across 2 or 8 links, each cell takes 128 ns for the OC-48 cell format or 32 ns for the OC-192 cell format.

TABLE 2

MS Link to Subchannel Mapping for Ingress/Egress Channels using ViX-v3 OC-48 Cell Format

| Physical Link # | Subchannel # | Subchannel Link # |
|---|---|---|
| 0 (10) (20) (30) | Subchannel 0 | 0 |
| 1 (11) (21) (31) | Subchannel 0 | 1 |
| 2 (12) (22) (32) | Subchannel 1 | 0 |
| 3 (13) (23) (33) | Subchannel 1 | 1 |
| 4 (14) (24) (34) | Subchannel 2 | 0 |
| 5 (15) (25) (35) | Subchannel 2 | 1 |
| 6 (16) (26) (36) | Subchannel 3 | 0 |
| 7 (17) (27) (37) | Subchannel 3 | 1 |
| 8 (18) (28) (38) | N/A | N/A |
| 9 (19) (29) (39) | N/A | N/A |

TABLE 3

MS Link to Subchannel Mapping for Ingress/Egress Channels using ViX-v3 OC-192 Cell Format

| Physical Link # | Subchannel # | Subchannel Link # |
|---|---|---|
| 0 (10) (20) (30) | Subchannel 0 | 0 |
| 1 (11) (21) (31) | Subchannel 0 | 1 |
| 2 (12) (22) (32) | Subchannel 0 | 2 |
| 3 (13) (23) (33) | Subchannel 0 | 3 |
| 4 (14) (24) (34) | Subchannel 0 | 4 |

TABLE 3-continued

MS Link to Subchannel Mapping for Ingress/Egress
Channels using ViX-v3 OC-192 Cell Format

| Physical Link # | Subchannel # | Subchannel Link # |
|---|---|---|
| 5 (15) (25) (35) | Subchannel 0 | 5 |
| 6 (16) (26) (36) | Subchannel 0 | 6 |
| 7 (17) (27) (37) | Subchannel 0 | 7 |
| 8 (18) (28) (38) | N/A | N/A |
| 9 (19) (29) (39) | N/A | N/A |

Switch Planes

Figure 16:
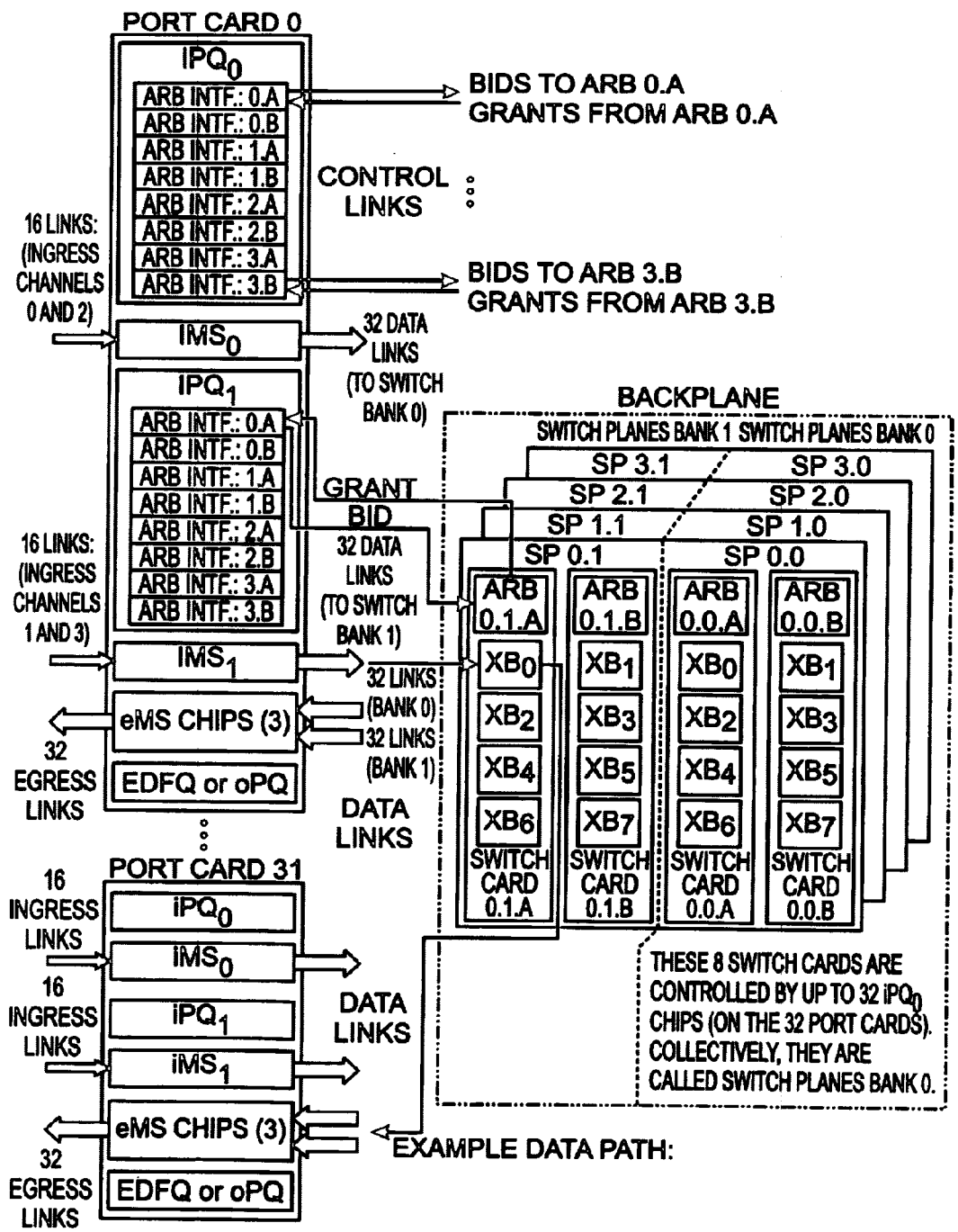
FIG. 16 is a schematic block diagram depicting the switch fabric backplane.

Two switch cards, that together service a backplane channel, form a switch plane. A backplane channel, as defined in the previous subsection, consists of a group of backplane data links from the MS that carry traffic to the same switch plane. The timing of the links in a backplane channel is such that one link is serviced in the channel every 32 ns with all the links in that channel getting serviced in one cell time. In a fully provisioned 32×32 port card system, there would be 32 4-channel port cards and 16 switch cards forming 2 banks of 4 switchplanes as shown in FIG. 16.

The entity that makes two switch cards function together as a switch plane to service a backplane channel is the iPQ. The association between a switchplane and (two) switch cards is determined by the particular association of arbiter and iPQ. The association between switchplane bank and switchplane is determined by the iPQ connected to the switchplane. An iPQ communicates only with the arbiter on a switch card. The arbiter is then responsible for configuring the crossbars.

Figure 15:
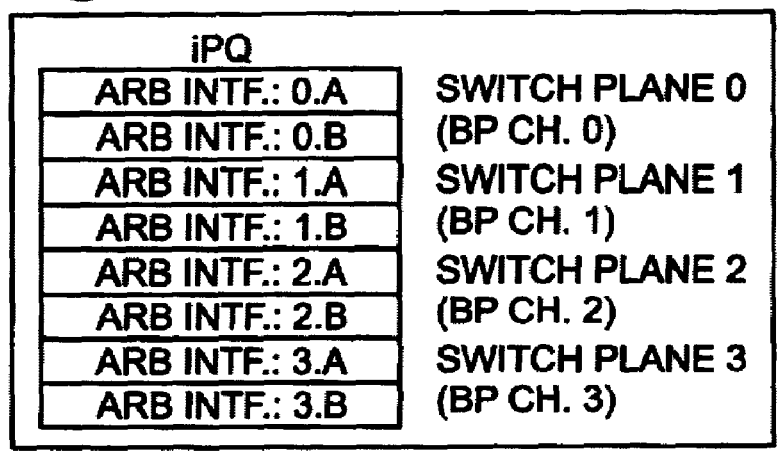
FIG. 15 is a diagram depicting iPQ arbiter interface to switchplane and backplane channel mapping.

FIG. 15 is a diagram depicting iPQ arbiter interface to switchplane and backplane channel mapping. The arbiter interfaces on the iPQ directly correspond to the backplane channels of the MS, as shown. In other words, arbiter interfaces 0.A and 0.B handles the bids and grants for backplane channel 0. The two arbiters attached to interfaces 0.A and 0.B form switchplane 0 (as shown in FIG. 16) that controls the crossbars attached to the links of backplane channel 0. An iPQ has 8 arbiter interfaces and can handle the bids and grants to 4 switch planes, thus servicing all the 4 backplane channels possible in an MS. A 4-ingress channel configuration, shown in FIG. 11, requires two iPQs and two MSs to support a 2× speedup (generates 8 backplane channels).

When there are two iPQs, each one controls a "bank" of switchplanes. To uniquely identify switchplanes, the associated backplane channel and switchplane bank must be known. The nomenclature SP X.Y is used where X is the switchplane number (and backplane channel) and Y is the switchplane bank. There are two switchplane banks, banks 0 and 1. Switchplane bank 0 switchplanes are defined as those connected to the iPQ that is servicing packets that came from ingress channels 0 and 2. Switchplane bank 1 switchplanes are defined as those connected to the iPQ servicing ingress channels 1 and 3.

The arbiters in a switchplane are denoted by the switchplane number and by the arbiter interface to which they are attached. An arbiter, and its switch card, is uniquely identified by the nomenclature Arb X.Y.Z, where X is the switchplane number, Y is the switchplane bank, and Z is the arbiter interface (A or B) on the iPQ from which the arbiter is receiving bids. An arbiter attached to an A interface handles bids and grants for even numbered links. The arbiter attached to the B interface handles the bids and grants for the odd numbered links of its backplane channel.

FIG. 16 is a schematic block diagram depicting the switch fabric backplane. The crossbars on the A cards are even numbered and those on the B cards are odd numbered. A specific crossbar ALWAYS handles the SAME numbered link from each of the port cards. For instance, all the link 0's of a specific backplane channel from all the port cards will be attached to the same crossbar, with the position on the crossbar set by which card in the system the link is coming from. In a 32-port system, this will entirely fill the crossbar with link 0's. The link 1's would then go to the first crossbar on the B card of the switchplane. The link 2's would go on the second crossbar of the A card. This relationship continues until all the crossbars in the switchplane are filled. Examples of the connectivity are provided below in a later section.

Speedup

Speedup has already been mentioned in terms of the number of links entering the MS, as compared to the number of links leaving the MS. That calculation results in the backplane speedup. There is also a speedup associated with getting into and out of an ingress or egress channel, respectively. This speedup is defined as the channel speedup. The channel speedup is dependent on the raw amount of traffic, the cell size, cellification efficiency, the number of links, and the link speed with the 8B/10B coding removed. Following are some examples that show the actual available link bandwidths using an 80% cellification efficiency:

64-byte unicast cell with 8 overhead bytes: The total available bandwidth for payload would then be 2 Gbps×56/64=1.75 Gbps. Given a cellification efficiency of 80%, there would then be 1.4 Gbps used for payload per link;

64-byte multicast cell with 11 overhead bytes: available payload bandwidth=2 Gbps×53/64=1.656 Gbps. With a cellification efficiency of 80%, there would then be 1.325 Gbps used for payload per link;

80-byte unicast cell with 8 overhead bytes: available payload bandwidth=2 Gbps×72/80=1.8 Gbps. With a cellification efficiency of 80%, there would then be 1.44 Gbps used for payload per link; and, 80-byte multicast cell with 11 overhead bytes: available payload bandwidth=2 Gbps×69/80=1.725 Gbps. With a cellification efficiency of 80%, there would then be 1.38 Gbps used for payload per link.

Using the first example, assuming an OC-192 (9.95328 Gbps) of raw data bandwidth, and 8 ingress links per channel, the channel speedup would be (8×1.4)/9.95328=1.125. The total system speedup, if the backplane speedup were 2, would be 1.125×2=2.25.

Active Redundancy

When cards in a switch plane fail or are removed, the iPQs automatically distribute the traffic across the remaining switchplanes. Since there is a speedup across the backplane, the loss or removal of a card would cause a decrease in the amount of switching resources but would not cause any traffic to stop being switched. In the case of a link failure, the crossbar informs its arbiter, and the arbiter ceases to grant connections for that link.

Configurations

The switch fabric can be optimized for three different port card counts. These optimizations result in reduced chip count and hence less system power. The fabric can be optimized for 8×8, 16×16, or 32×32 port card switching.

Number of Arbiters and Crossbars Required

The number of arbiters required in a system is dependent on the number of ingress/egress and backplane channels. Two arbiters are required to service a backplane channel when redundancy is required such that the following general relationship applies:

# of Arbiters=(# ingress channels×speedup×2 Arbiters per backplane channel)/divisor.

Values of less than 2 are rounded up to 2. In most systems, the minimum number of arbiters is 2. The speedup is either 1 or 2. If the actual speedup is greater than 1, then 2 should be used in the equation. For an 8×8 configuration, the divisor would be 4. For 16×16, the divisor is 2. For 32×32, the divisor would be 1.

The number of crossbars that are required in a system is dependent on how many links are being used to create the backplane channels. There should be an even number of crossbars and they would be divided evenly across the switch cards. The following equation, for most cases, provides the correct number of crossbars:

# of Crossbars=(# links per ingress channel×# of ingress channels per port×# of port cards× speedup)/32.

For the 8×8 configuration, the # of crossbars should be multiplied by (4×# of iMS)/(# backplane channels per port card). The number of port cards should be rounded up to the nearest supported configuration, i.e. 8, 16, or 32. The speedup in the case of crossbars should be the fractional speedup that is desired.

Example to determine the number of arbiters and crossbars for the following system:

4 channel port cards (40 Gbps)
8 links per channel
16 port cards
Speedup=1.5
# of arbiters=(4×2×2)/2=8
# of crossbars=(8×4×16×1.5)/32=24. This would give 3 crossbars per arbiter.

32×32 Configuration

The 32×32 configuration is used for all cases where expansion to 32 port cards is desired, or where the number of port cards is greater than 16. All configurations, including the 32×32, can be used with single channel, 2-channel, or 4-channel port cards. The 32×32 case is the simplest of cases to conceptually understand the wiring and is hence presented first.

FIG. 17 is a schematic block diagram illustrating a 32×32 single channel system, using 8 links per channel, with a 2× backplane speedup. This system is also optimized to use one MS for ingress and egress on each port card. The simplest correlation of backplane channels 1 and 2 on the port cards is with switch planes 1 and 2. In the figure, only the connectivity for switchplane 1 is drawn for clarity. Switchplane 2 is shown behind switchplane 1 and would be wired identically except that switchplane 2 would be connected to the iPQs' arbiter 2 interface and a different backplane channel. Points to note in FIG. 17 are the following:

In the single channel configuration, the egress MS is the same device as the ingress MS. Ingress and egress links 30–39 on the MS would not be used and would be powered off. Arbiter interfaces 0.A, 0.B, 3.A and 3.B are unused and would be powered off. MS links 0–7 are used for both the ingress and egress to the traffic manager. Backplane channels 1 and 2 are used for the backplane connectivity. Each crossbar always handles the same numbered link from each port card. Link numbers on the crossbars correspond to the port card numbers. Link numbers on the MSs to the backplane, modulo 10, correspond to the backplane channel's link number. If it were desired to run 10-links per channel, a 5th crossbar would be added to each switch card.

To expand the system beyond a single ingress channel, thus adding more backplane channels, would require adding more switchplanes, with one switchplane per backplane channel.

In general, there should always be symmetry between the ingress and egress side of a port card, and the input and output sides of the backplane. When using multiple MSs, as in the 2- and 4-channel cases, the same symmetry would be maintained as in the single-channel case. Backplane channels would match up with each other as well as the link numbers the ingress and egress channels are using.

16×16 Configuration

The 16×16 configuration takes advantage of the fact that a 32×32 crossbar and arbiter can be treated as two 16×16 crossbars and arbiters. By doing this, the number of switchplanes, and hence arbiters and crossbars, required is reduced by half.

Figure 18:
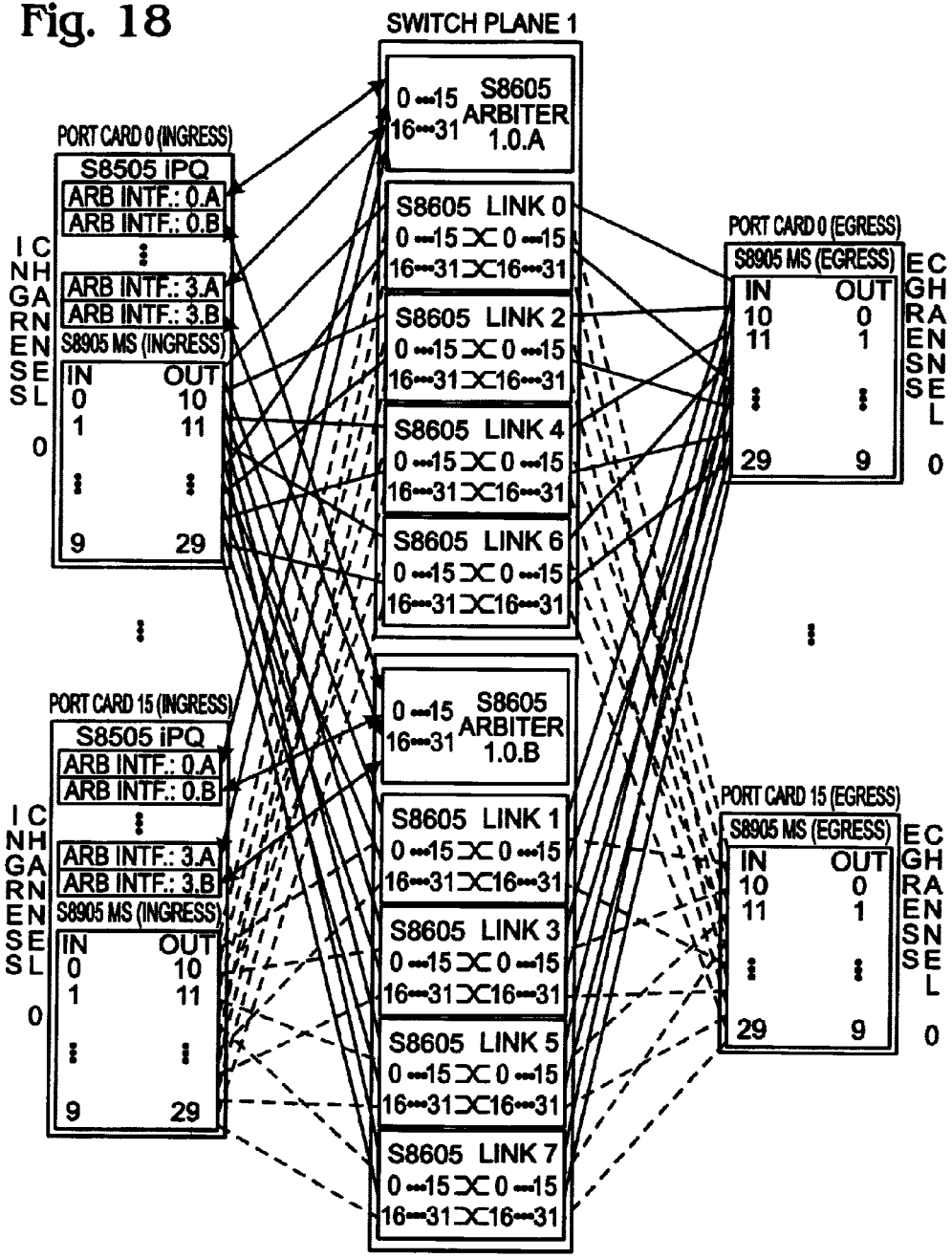
FIG. 18 is a schematic block diagram depicting a 16×16 channel system with 2× speedup.

FIG. 18 is a schematic block diagram depicting a 16×16 channel system with 2× speedup. 8 links per channel are used with non-aggregated bids. Points to note are the following:

In the single channel configuration, the egress MS is the same as the ingress MS. As far as the port card is concerned, the only difference between 16×16 and 32×32 is the organization of the switchplane. The port card remains the same. Backplane channels 1 and 2 are used for the backplane connectivity. Ingress and egress links 30–39 on the MS would not be used and would be powered off. Arbiter interfaces 0.A, 0.B, 3.A and 3.B on the iPQ are unused and would be powered off. MS links 0–7 are used for both the ingress and egress to the traffic manager. Each crossbar always handles the same numbered link within a backplane channel from each port card. Link numbers on the crossbars, modulo 16, correspond to the port card numbers. Link numbers on the MSs to the backplane, modulo 10, correspond to the backplane channel's link number. If it were desired to run 10-links per channel, a 5th crossbar would be added to each switch card.

To expand to more than a single channel, the two-channel or four-channel port card would be used. The backplane connectivity would essentially remain the same except for the addition of more switch planes to handle the increase in backplane channels.

Figure 19:
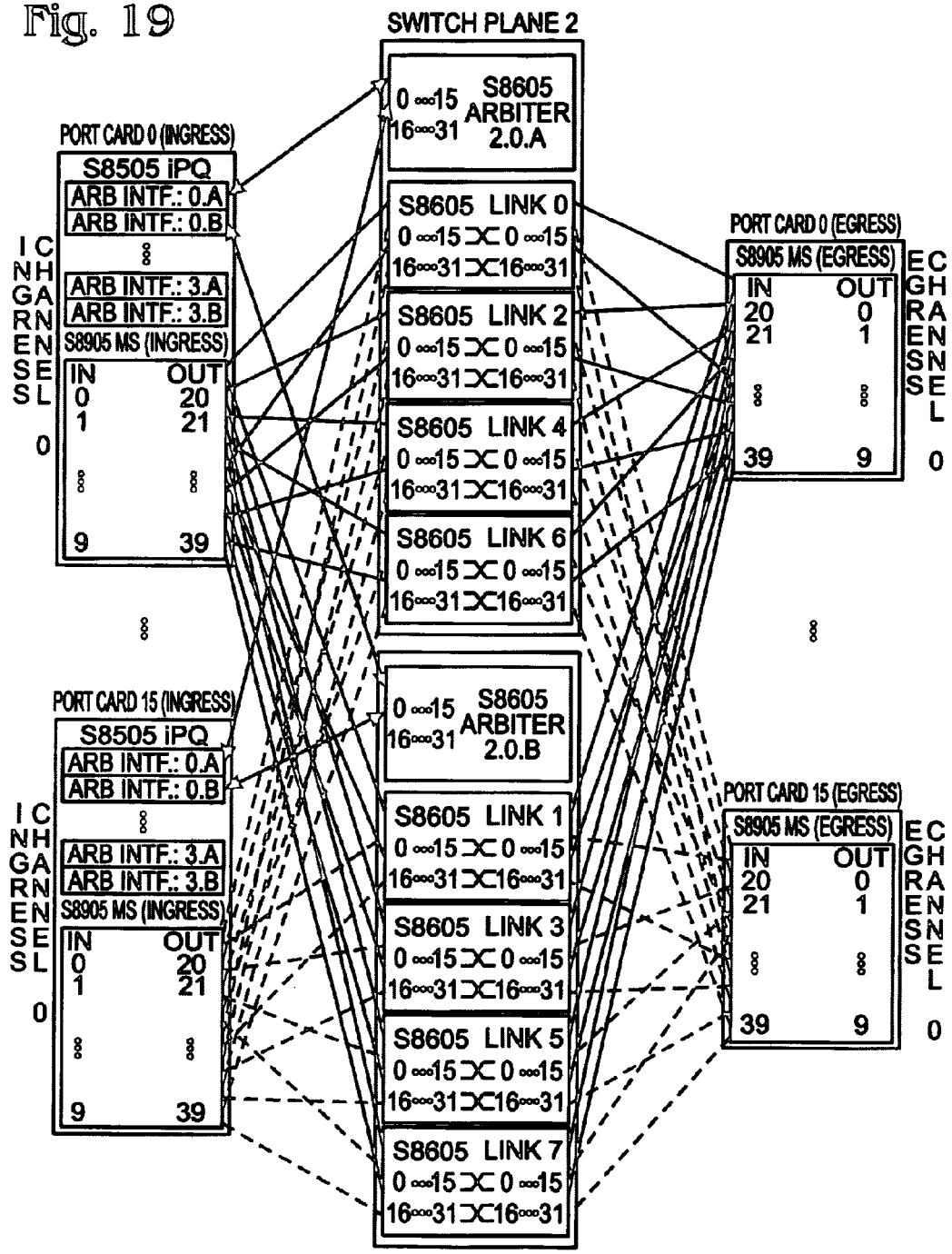
FIG. 19 is a schematic block diagram illustrating the connectivity of a 16×16 single channel system, with a 2× backplane speedup, using 8 links per channel and aggregated bids.

FIG. 19 is a schematic block diagram illustrating the connectivity of a 16×16 single channel system, with a 2× backplane speedup, using 8 links per channel and aggregated bids. The advantage of aggregating bids and grants is that the number of iPQ to arbiter connections is reduced from 4 to 2 per port card. Points to note are the following:

In the single channel configuration, the egress MS is the same as the ingress MS. Since aggregation at the iPQ for 2 backplane channels group [0, 1] together and [2, 3] together, bids and grants come through 2A and 2B. Backplane channels 2 and 3 are used for the backplane connectivity. Ingress and egress links 10–19 on the MS would not be used and would be powered off. Links 16–31 on the arbiters would not be used and would be powered off. Arbiter interfaces 0.A, 0.B, 1.A, 1.B, 3.A and 3.B on the iPQ are unused and would be powered off. MS links 0–7 are used for both the ingress and egress to the traffic manager. Each crossbar always handles the same numbered link within a backplane channel from each port card. Link numbers on the crossbars, modulo 16, correspond to the port card numbers. Link numbers on the MSs to the backplane, modulo 10, correspond to the backplane channel's link number. If it were desired to run 10-links per channel, a 5th crossbar would be added to each switch card.

To expand to more than a single channel, the two-channel or four-channel port card would be used. The backplane connectivity would essentially remain the same except for the addition of more switch planes to handle the increase in backplane channels.

8×8 Configuration

The 8×8 configuration takes advantage of the fact that each arbiter and crossbar can be treated as four 8×8 arbiters and crossbars. In a system with 8 port cards or less, this means that there would be ¼ of the switching resources required to build the same system using the 32×32 configuration, or ½ of the switching resources to build the same system using the 16×16 configuration. If more than 8, but less than 17 port cards are required, then the 16×16 configuration would have to be used.

Figure 20:
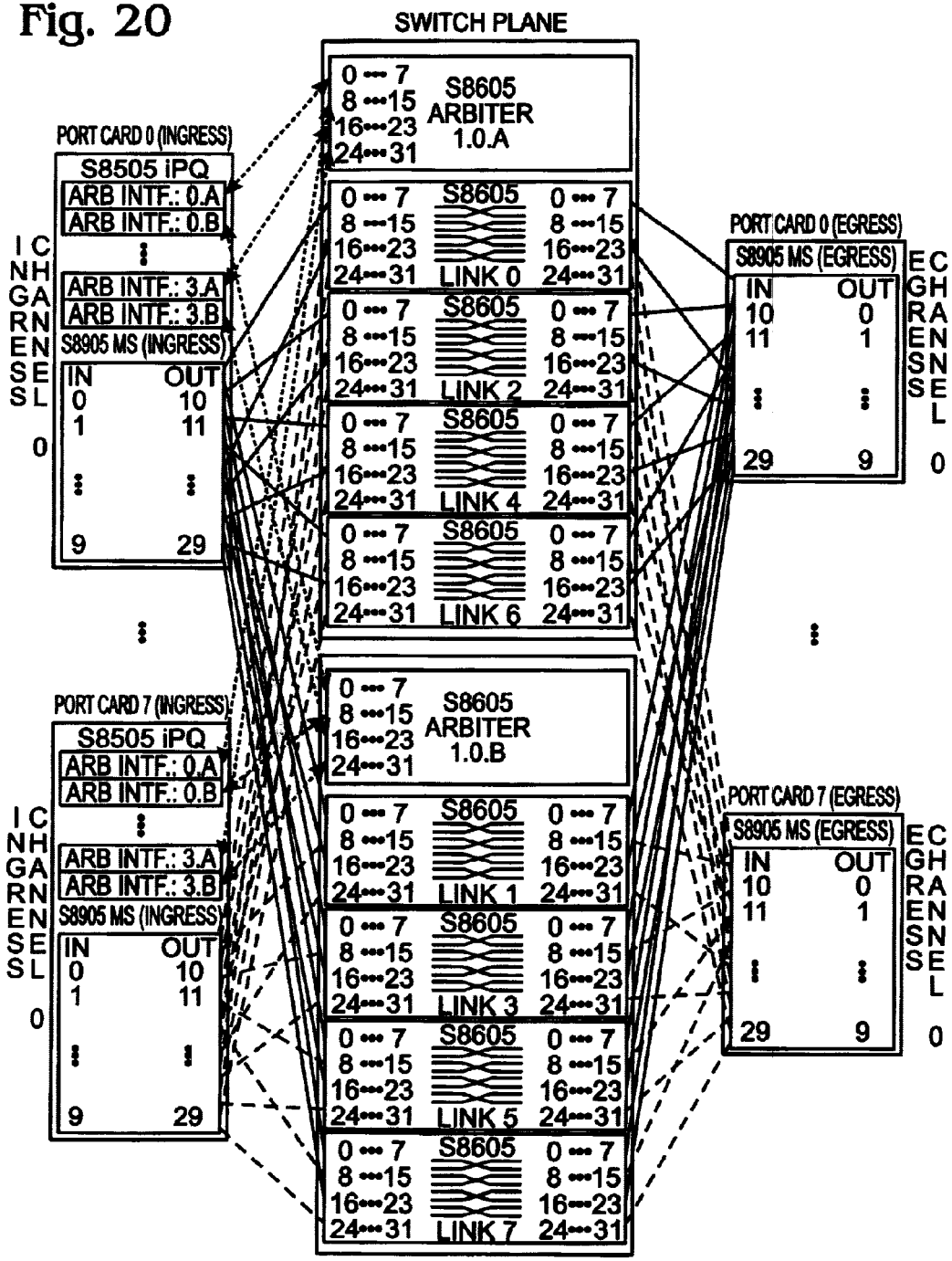
FIG. 20 is a schematic block diagram illustrating the connectivity for an 8×8 single channel system, with a 2× backplane speedup, using 8 links per channel and non-aggregated bids.

FIG. 20 is a schematic block diagram illustrating the connectivity for an 8×8 single channel system, with a 2× backplane speedup, using 8 links per channel and non-aggregated bids. Links 0–7 and 24–31 on the arbiter are not used. Bids and grants for the 4 sections of each crossbar are handled by the same arbiter. The points to note about the 8×8 configuration shown in FIG. 20 are the following:

In the single channel configuration, the egress MS is the same as the ingress MS. As far as the port card is concerned, the only difference between 8×8 and 16×16 is the organization of the switchplane. The port card remains the same. Ingress and egress links 30–39 on the MS would not be used and would be powered off. Links 0–7 and 24–31 on the arbiters would not be used and would be powered off. Links 0–7 and 24–31 on the crossbars would not be used and would be powered off. Arbiter interfaces 0.A, 0.B, 3.A and 3.B on the iPQ are unused and would be powered off. MS links 0–7 are used for both the ingress and egress to the traffic manager. Backplane channels 1 and 2 are used for the backplane connectivity. Each crossbar always handles the same numbered link within a backplane channel from each port card. Link numbers on the crossbars, modulo 8, correspond to the port card numbers. Link numbers on the MSs to the backplane, modulo 10, correspond to the backplane channel's link number. If it were desired to run 10-links per channel, a 5th crossbar would be added to each switch card.

If the port cards in FIG. 20 were upgraded to 2-channel port cards, no additional switching resources would be required. Links 0–7 and 24–31 of each of the crossbars would be wired to handle the extra two backplane channels. To modify the system to handle 4-channel port cards would simply require the addition of a switch plane.

Figure 21:
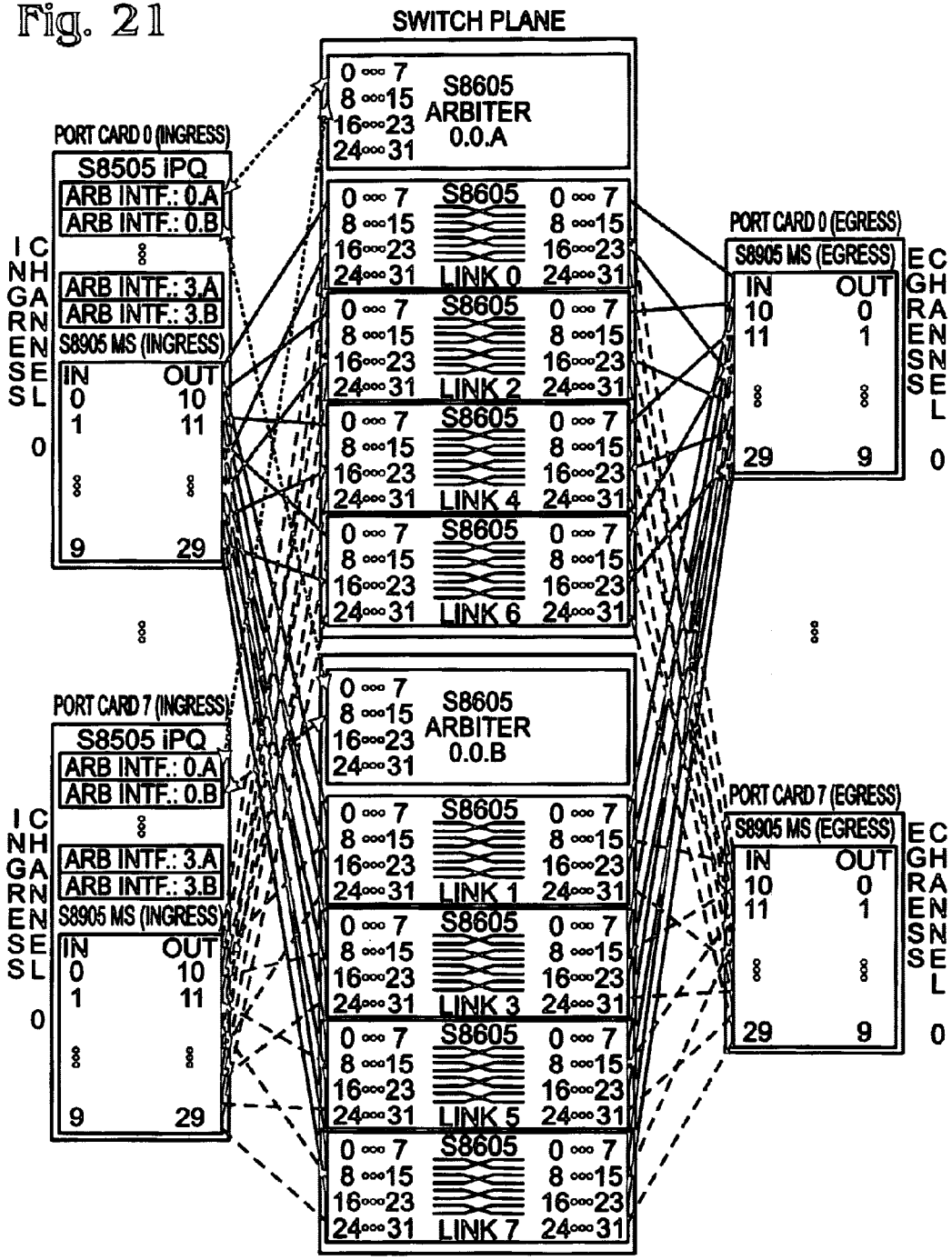
FIG. 21 is a schematic block diagram depicting the connectivity for an 8×8 single channel system, with a 2× backplane speedup, using 8 links per channel and aggregated bids.

FIG. 21 is a schematic block diagram depicting the connectivity for an 8×8 single channel system, with a 2× backplane speedup, using 8 links per channel and aggregated bids. Links 8–31 on the arbiter are not used in 8×8 mode, since the bids and grants for the 4 sections of each crossbar are aggregated and handled by the same arbiter interface. Bids and grants for unused crossbar sections will be nulled out at the iPQ. The points to note about the 8×8 configuration shown in FIG. 21 are the following:

In the single channel configuration, the egress MS is the same as the ingress MS. As far as the port card is concerned, the only difference between 8×8 and 16×16 is the organization of the switchplane. The port card always remains the same. Ingress and egress links 30–39 on the MS would not be used and would be powered off. Links 8–31 on the arbiters would not be used and would be powered off. Links 0–7 and 24–31 on the crossbars would not be used and would be powered off. Arbiter interfaces 1.A through 3.B on the iPQ are unused and would be powered off. MS links 0–7 are used for both the ingress and egress to the traffic manager. Backplane channels 1 and 2 are used for the backplane connectivity. Each crossbar always handles the same numbered link within a backplane channel from each port card. Link numbers on the crossbars, modulo 8, correspond to the port card numbers. Link numbers on the MSs to the backplane, modulo 10, correspond to the backplane channel's link number. If it were desired to run 10-links per channel, a 5th crossbar would be added to each switch card.

If the port cards in FIG. 21 were upgraded to 2-channel port cards, no additional switching resources would be required. Links 0–7 and 24–31 of each of the crossbars would be wired to handle the extra two backplane channels. To modify the system to handle 4-channel port cards would simply require the addition of a switch plane.

FIGS. 22*a* and 22*b* are flowcharts illustrating the present invention method for tolerating control line faults in a packet communications switch fabric. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 2200.

Step 2202 accepts information packets including a plurality of cells, at a plurality of port card ports, the plurality of information packets addressing a plurality of port card ports. Step 2204 selectively connects port card ports to port card backplane data links. Step 2206, in response to backplane control link communications, selectively connects port card backplane data links and crossbars. Step 2208 senses a connection fault in a control link. Step 2210, in response to sensing the control link fault, reselects connections between the port card ports and the port card backplane data links.

In some aspects of the method, selectively connecting port card backplane data links and crossbars in Step 2206 includes substeps. Step 2206*a* for a particular backplane data link, fixedly connects each port card to a corresponding interface of an assigned crossbar. Step 2206*b* selectively enables the connection to each crossbar.

In some aspects, fixedly connecting each port card to a corresponding interface of an assigned crossbar (Step 2206*a*) includes substeps. Step 2206*a*1 assigns an ingress priority queue (iPQ) to a group of data links. Step 2206*a*2 assigns an arbiter to control a crossbar. Then, selectively enables the connection to each crossbar (Step 2206*b*) includes negotiating between the arbiter and the iPQ for the use of the crossbar.

In other aspects, fixedly connecting each port card to a corresponding interface of an assigned crossbar (Step 2206*a*) also includes fixedly connecting a bid/grant control link between the iPQ and the arbiter to request access to the crossbar for a corresponding channel group of data links.

In some aspects, Step 2206*a* includes organizing each port card into a second plurality of backplane data links, separated into a fourth plurality of link divisions, where each link division includes a seventh plurality of channels, and where each channel includes a fifth plurality of channel groups. Then, fixedly connecting a bid/grant control link between the iPQ and the arbiter to request access to the crossbar for a corresponding channel of data links includes other substeps. Step 2206a3 establishes an iPQ for each link division. This is a simple 1:1 relationship when considering the ingress backplane data links and the ingress port card. With respect to the egress port card and egress backplane data links, it should be understood that all link division egress travel flow is routed through a single eMS (per egress port card). However, control channel communications with the egress port card concerning a particular link division are still routed through a corresponding iPQ. Step 2206a4 establishes a control channel for each data channel group. Step 2206a5 establishes a control channel group for each data channel group. Step 2206a6 establishes a bid/grant control link for each control channel group.

In some aspects of the method, sensing a connection fault in the control link in Step 2208 includes substeps. Step 2208a includes each arbiter monitoring connected bid links. Step 2208b includes the received bid communications from a iPQ exceeding an error threshold. In other aspects, Step 2208c includes each iPQ monitoring connected grant links. Step 2208d includes the received grant communications from an arbiter exceeding an error threshold.

In some aspects, reselecting connections between the port card ports and the port card backplane data links in response to sensing the control link fault in Step 2210 includes reselecting a backplane data link in response to detecting a fault in an associated control link. More specifically, Step 2210 reselecting a data channel group in response to detecting a control link fault in an associated control channel group.

In some aspects, selectively connecting port card ports to port card backplane data in Step 2204 includes substeps. Step 2204a includes each port card accepting packets on a sixth plurality of ingress data links through a corresponding sixth plurality of port card ingress ports separated into a fourth plurality of ingress port groups. Step 2204b stores the accepted packets in a fourth plurality of port card ingress memory subsystems (iMSs) corresponding to the fourth plurality of ingress port groups, as well as to a fourth plurality of iPQs. Step 2204c assigns packets to a second plurality of port card ingress backplane data links, separated into a fourth plurality of link divisions, corresponding to the fourth plurality of iMSs, each link division including a seventh plurality of data channels, each data channel including a fifth plurality of data channel groups, each data channel group including a third plurality of data links. Step 2204d supplies assigned packets to the selected port card backplane data links from the iMSs.

In some aspects, assigning packets to a second plurality of port card ingress backplane data links (Step 2204c) includes evenly distributing the packets among the ingress backplane data links. Then, reselecting a backplane data link in response to detecting a fault in an associated control link (Step 2210) includes redistributing packets in the iMS to non-faulty ingress backplane data links.

The egress function works in a manner analogous to the ingress function. For this reason and for greater clarity, the egress functions associated with Step 2204 are not shown. Step 2204e includes each port card accepting packets on a second plurality of port card egress backplane data links from crossbars, separated into a fourth plurality of link divisions, each link division including a seventh plurality of data channels, each data channel including a fifth plurality of data channel groups, each data channel group including a third plurality of data links. Step 2204f stores the accepted packets in an egress memory subsystem (eMS). There are a fourth plurality of fMSs, corresponding to the fourth plurality of link divisions, interposed between the egress backplane data links and the eMS. Step 2204g assigns packets to a sixth plurality of port card egress ports, separated into a fourth plurality of egress port groups (corresponding to the fourth plurality of fMSs). Step 2204h supplies assigned packets to selected port card egress ports from the eMS. Step 2204i includes each port card supplying packets on a sixth plurality of egress data output links through the corresponding sixth plurality of port card ports.

In some aspects, accepting packets on a second plurality of port card egress backplane data links from crossbars (Step 2204e) includes evenly distributing the packets among the egress backplane data links. Then, reselecting a backplane data link in response to detecting a fault in an associated control link (Step 2210) includes redistributing the transmission of packets to the eMS, through interposed fMSs, on non-faulty egress backplane data links.

In some aspects, fixedly connecting each port card to a corresponding interface of an assigned crossbar (Step 2206a) includes further substeps. Step 2206a7 establishes a first plurality of crossbar inputs and a first plurality of crossbar outputs. Step 2206a8 establishes a third plurality of crossbars per switch card. Step 2206a9 establishes a fifth plurality of switch cards per switchplane. Step 2206a10 establishes a seventh plurality of switchplanes per switchplane (SP) bank. Step 2206a11 establishes a fourth plurality of switchplane banks per backplane. Then, assigning an arbiter to control a crossbar (Step 2206a2) includes assigning one arbiter to each switch card, to control a third plurality of crossbars.

In some aspects, establishing a bid/grant control link for each control group (Step 2206a6) includes substeps. Step 2206a6a, for each iPQ (link division), establishes a corresponding switchplane bank. Step 2206a6b connects a control channel to a corresponding switchplane in the switchplane bank. Step 2206a6c connects a control channel group to each switch card (arbiter) in the switchplane.

In one aspects of the method, the first and sixth pluralities are a maximum number of 32, the second plurality is a maximum value of 64, the third and seventh pluralities are a maximum value of 4, and the fourth and fifth pluralities are a maximum value of 2.

A system and method for tolerating switch fabric control link faults has been presented. The invention was explained using specific examples and number values, however the invention is not limited to merely these examples. Other variations and embodiments of the invention will occur to those skilled in the art.

We claim:

1. A method for tolerating control line faults in a packet communications switch fabric, the method comprising:

accepting information packets including a plurality of cells, at a plurality of port card ports, the plurality of information packets addressing a plurality of port card ports;

selectively connecting port card ports to port card backplane data links;

in response to backplane control link communications, selectively connecting port card backplane data links and crossbars;

sensing a connection fault in a control link; and, in response to sensing the control link fault, reselecting connections between the port card ports and the port card backplane data links, wherein selectively connecting port card backplane data links and crossbars includes:

for a particular backplane data link, fixedly connecting each port card to a corresponding interface of an assigned crossbar; and, selectively enabling the connection to each crossbar, wherein fixedly connecting each port card to a corresponding interface of an assigned crossbar includes: assigning an ingress priority queue (iPQ) to a group of data links; and, assigning an arbiter to control a crossbar; and, wherein selectively enabling the connection to each crossbar includes negotiating between the arbiter and the iPQ for the use of the crossbar.

2. The method of claim 1 wherein fixedly connecting each port card to a corresponding interface of an assigned crossbar includes fixedly connecting a bid/grant control link between the iPQ and the arbiter to request access to the crossbar for a corresponding channel group of data links.

3. The method of claim 2 wherein fixedly connecting each port card to a corresponding interface of an assigned crossbar includes each port card having a second plurality of backplane data links, separated into a fourth plurality of link divisions, each link division including a seventh plurality of channels, each channel including a fifth plurality of channel groups;
wherein fixedly connecting a bid/grant control link between the iPQ and the arbiter to request access to the crossbar for a corresponding channel of data links includes:
establishing an iPQ for each link division;
establishing a control channel for each data channel group;
establishing a control channel group for each data channel group; and,
establishing a bid/grant control link for each control channel group.

4. The method of claim 3 wherein sensing a connection fault in the control link includes:
each arbiter monitoring connected bid links; and,
the received bid communications from a iPQ exceeding an error threshold.

5. The method of claim 3 wherein sensing a connection fault in the control link includes:
each iPQ monitoring connected grant links; and,
the received grant communications from an arbiter exceeding an error threshold.

6. The method of claim 3 wherein reselecting connections between the port card ports and the port card backplane data links in response to sensing the control link fault includes reselecting a backplane data link in response to detecting a fault in an associated control link.

7. The method of claim 6 wherein reselecting a backplane data link in response to detecting a fault in an associated control link includes reselecting a data channel group in response to detecting a control link fault in an associated control channel group.

8. The method of claim 3 wherein selectively connecting port card ports to port card backplane data includes:
each port card accepting packets on a sixth plurality of ingress data links through a corresponding sixth plurality of port card ingress ports separated into a fourth plurality of ingress port groups;
storing the accepted packets in a fourth plurality of port card ingress memory subsystems (iMSs) corresponding to the fourth plurality of ingress port groups;
assigning packets to a second plurality of port card ingress backplane data links, separated into a fourth plurality of link divisions, corresponding to the fourth plurality of iMSs, each link division including a seventh plurality of data channels, each data channel including a fifth plurality of data channel groups, each data channel group including a third plurality of data links; and,
supplying assigned packets to the selected port card backplane data links from the iMSs.

9. The method of claim 8 wherein selectively connecting port card ports to port card backplane data links includes:
each port card accepting packets on a second plurality of port card egress backplane data links from crossbars, separated into a fourth plurality of link divisions, each link division including a seventh plurality of data channels, each data channel including a fifth plurality of data channel groups, each data channel group including a third plurality of data links;
storing the accepted packets in an egress memory subsystems (eMS);
assigning packets to a sixth plurality of port card egress ports, separated into a fourth plurality of egress port groups;
supplying assigned packets to selected port card egress ports from the eMS; and,
each port card supplying packets on a sixth plurality of egress data links through the corresponding sixth plurality of port card ports.

10. The method of claim 9 wherein fixedly connecting each port card to a corresponding interface of an assigned crossbar, for a particular backplane data link, includes:
establishing a first plurality of crossbar inputs and a first plurality of crossbar outputs;
establishing a third plurality of crossbars per switch card;
establishing a fifth plurality of switch cards per switchplane;
establishing a seventh plurality of switchplanes per switchplane bank;
establishing a fourth plurality of switchplane banks per backplane; and,
wherein assigning an arbiter to control a crossbar includes assigning one arbiter to each switch card, to control a third plurality of crossbars.

11. The method of claim 10 wherein establishing a bid/grant control link for each control group includes:
for each link division, establishing a corresponding switchplane bank;
connecting a control channel to a corresponding switchplane in the switchplane bank;
connecting a control channel group to each switch card (arbiter) in the switchplane.

12. The method of claim 11 wherein the first and sixth pluralities are a maximum number of 32; and,
wherein the second plurality is a maximum value of 64.

13. The method of claim 12 wherein the third and seventh pluralities are a maximum value of 4; and
wherein the fourth and fifth pluralities are a maximum value of 2.

14. The method of claim 11 wherein assigning packets to a second plurality of port card ingress backplane data links includes evenly distributing the packets among the ingress backplane data links; and,
wherein reselecting a backplane data link in response to detecting a fault in an associated control link includes redistributing packets in the iMS to non-faulty ingress backplane data links.

15. The method of claim 11 wherein each port card accepting packets on a second plurality of port card egress backplane data links from crossbars includes evenly distributing the packets among the egress backplane data links; and,
wherein reselecting a backplane data link in response to detecting a fault in an associated control link includes redistributing the transmission of packets to the eMS by non-faulty egress backplane data links.

16. A switch fabric system for tolerating control line faults, the system comprising:
a plurality of port cards, each port card including:
a plurality of ports to communicate information packets including a plurality of cells, on ingress/egress data links; and,
a plurality of backplane data links to transfer packets between port cards;
at least one ingress priority queue (iPQ) having a port to accept error messages associated with faulty signals controlling the inter-port card transfer of packets on the backplane data links, and to reselect inter-port card connections on the backplane data links in response to error messages, and;
at least one crossbar having a control input operatively connected to accept control signals from the iPQ, the crossbar selectively connecting crossbar inputs and crossbar outputs in response to the iPQ control signals.

17. The system of claim 16 wherein each crossbar has inputs fixedly connected, and selectively enabled, to a backplane data link from each port card, and outputs fixedly connected, and selectively enabled, to a backplane channel from each port card.

18. The system of claim 17 wherein each iPQ is assigned to a group of backplane data links; and,
the system further comprising:
a switch card including:
an arbiter assigned to each crossbar having a port connected to the iPQ to negotiate for the use of the crossbar and a port connected to supply commands to the crossbar control input; and,
at least one crossbar, each crossbar having inputs selectively enabled to crossbar outputs in response to commands received at the control input.

19. The system of claim 18 wherein the iPQ has a bid control link connected to the arbiter to request access to the crossbar, and a grant control link connected to the arbiter to receive crossbar grants from the arbiter.

20. The method of claim 19 wherein each switch card includes a third plurality of crossbars controlled by an arbiter, wherein each crossbar input is connected to a particular backplane data link from each port card, and wherein each crossbar output connected to a particular backplane data link from each port card;
wherein each port card includes a second plurality of backplane data links, separated into a fourth plurality of link divisions, each link division including a seventh plurality of data channels, each data channel including a fifth plurality of data channel groups, each data channel group including a third plurality of data links; and,
wherein each port card includes a fourth plurality of iPQs, each iPQ assigned to a link division and having a seventh plurality of control channels corresponding to the data channels, each control channel including a fifth plurality of control channel groups corresponding to the data channel groups, and each control channel group including a bid/grant control link to negotiate crossbar access for a corresponding third plurality of data links.

21. The system of claim 20 wherein the arbiter includes a monitor with an input to accept requests on the bid link and an output connected to the corresponding grant link to send error messages to the iPQ when the bid communications exceed an error threshold; and,
wherein the iPQ reselects intra-port card connections between ports and the backplane data links in response to receiving the error messages.

22. The system of claim 21 wherein the iPQ includes a monitor with an input to accept grant requests and an output connected to send error messages to the arbiter when the grant communications exceed an error threshold; and,
wherein the iPQ reselects intra-port card connections between ports and the backplane data links in response to receiving the error messages.

23. The system of claim 22 wherein each port card accepts packets on a sixth plurality of ingress data links through a corresponding sixth plurality of port card ingress ports separated into a fourth plurality of ingress port groups;
each port card further comprising:
a fourth plurality of port card ingress memory subsystems (iMSs) corresponding to the fourth plurality of ingress port groups, having inputs connected to the ingress ports, inputs to accept intra-port card transfer commands from the iPQ, and outputs to backplane data links;
wherein the iPQ includes a fourth plurality of iPQs corresponding to the fourth plurality of iMSs and fourth plurality of link divisions;
the system further comprising:
a fourth plurality of switchplane banks per backplane, each switchplane bank corresponding to a link division and including a seventh plurality of switchplanes, each switchplane corresponding to a channel and including a fifth plurality of switch cards, each switch card corresponding to a channel group and including a third plurality of crossbars.

24. The system of claim 23 wherein each port card supplies packets on a sixth plurality of egress data links through a corresponding sixth plurality of port card egress ports separated into a fourth plurality of egress port groups;
each port card further comprising:
an egress memory subsystems (eMS) having outputs connected to the egress ports, inputs to accept intra-port card transfer commands from the iPQ, and inputs to egress backplane data links; and,
an egress PQ (oPQ) to supply egress port commands to the eMS.

25. The system of claim 24 wherein the plurality of port cards include a first plurality of combination ingress/egress port cards; and,
wherein each crossbar has a first plurality of inputs and a first plurality of outputs.

26. The system of claim 25 wherein the first and sixth pluralities are a maximum number of 32; and,
wherein the second plurality is a maximum value of 64.

27. The system of claim 26 wherein the third and seventh pluralities are a maximum value of 4; and,
wherein the fourth and fifth pluralities are a maximum value of 2.

28. The system of claim 25 wherein the iPQ ceases scheduling packet communications between the MS the backplane data link associated with the faulty control link.

29. The method of claim 28 wherein the iPQ distributes packet communications between the MS and a first group of backplane data links in response to receiving a faulty control link associated with a second group of backplane data links.

* * * * *